US012669928B2

(12) United States Patent
Lee et al.

(10) Patent No.: US 12,669,928 B2
(45) Date of Patent: Jun. 30, 2026

(54) ELECTRONIC DEVICE AND OPERATION METHOD FOR DISPLAY CONTROL BASED ON WHEEL MANIPULATION

(71) Applicant: Samsung Electronics Co., Ltd., Suwon-si (KR)

(72) Inventors: Minwoo Lee, Suwon-si (KR); Taehwan Kim, Suwon-si (KR); Kwangsub Byun, Suwon-si (KR); Sungjin Son, Suwon-si (KR); Jooheon Lee, Suwon-si (KR); Junyoung Jeon, Suwon-si (KR); Junho Jung, Suwon-si (KR); Hyunseok Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/974,433

(22) Filed: Dec. 9, 2024

(65) Prior Publication Data

US 2025/0103201 A1     Mar. 27, 2025

Related U.S. Application Data

(63) Continuation of application No. PCT/KR2023/008762, filed on Jun. 23, 2023.

(30) Foreign Application Priority Data

Jul. 26, 2022     (KR) ........................ 10-2022-0092608

(51) Int. Cl.
| | |
|---|---|
| *G06F 3/0487* | (2013.01) |
| *G06F 3/0362* | (2013.01) |
| *G06F 3/0482* | (2013.01) |

(52) U.S. Cl.
CPC .......... *G06F 3/0487* (2013.01); *G06F 3/0362* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 8,826,333 | B2 | 9/2014 | Fujimoto |
| 9,794,506 | B2 | 10/2017 | Cho et al. |
| 10,204,439 | B2 | 2/2019 | Heo et al. |
| 10,230,916 | B2 | 3/2019 | Hyun et al. |
| 10,235,791 | B2 | 3/2019 | Choi et al. |
| 10,477,134 | B2 | 11/2019 | Lim et al. |

(Continued)

FOREIGN PATENT DOCUMENTS

| | | |
|---|---|---|
| CN | 203675482 U | 6/2014 |
| JP | 2012170048 A | 9/2012 |

(Continued)

OTHER PUBLICATIONS

International Search Report for PCT/KR2023/008762 mailed Sep. 20, 2023, 5 pages.

(Continued)

*Primary Examiner* — Kirk W Hermann
(74) *Attorney, Agent, or Firm* — Nixon & Vanderhye P.C.

(57) ABSTRACT

A method of controlling a user interface in an electronic device may include: obtaining a wheel-based signal being executed by wheel manipulation; and obtaining an input signal type supported by a running application; based on the input signal type being a first input signal type, transferring the obtained wheel-based signal to the running application; and based on the input signal type being a second input signal type, changing the obtained wheel-based signal to a direction control signal and transferring same to the running application.

20 Claims, 16 Drawing Sheets

(56) References Cited

U.S. PATENT DOCUMENTS

| | | | | |
|---|---|---|---|---|
| 2007/0229458 | A1 | 10/2007 | Moon | |
| 2013/0276030 | A1* | 10/2013 | Fujimoto | G06F 3/0482 |
| | | | | 725/40 |
| 2013/0335767 | A1* | 12/2013 | Ha | G03G 15/5016 |
| | | | | 358/1.13 |
| 2017/0180673 | A1* | 6/2017 | Hyun | G06F 3/0362 |
| 2017/0205904 | A1* | 7/2017 | Lee | G06F 3/0487 |
| 2018/0199001 | A1* | 7/2018 | Lim | H04N 21/42204 |
| 2020/0409478 | A1 | 12/2020 | Shastri | |
| 2023/0308706 | A1* | 9/2023 | Martch | H04N 21/4263 |
| 2024/0107101 | A1* | 3/2024 | Kim | H04N 21/42206 |

FOREIGN PATENT DOCUMENTS

| | | | | |
|---|---|---|---|---|
| KR | 200239248 | Y1 | 10/2001 | |
| KR | 20050091232 | A | 9/2005 | |
| KR | 100755973 | B1 | 9/2007 | |
| KR | 20110010023 | A | 1/2011 | |
| KR | 20120005142 | A * | 1/2012 | ............ G08C 17/02 |
| KR | 101365990 | B1 | 3/2014 | |
| KR | 20150101909 | A | 9/2015 | |
| KR | 20160112835 | A | 9/2016 | |
| KR | 20170074537 | A | 6/2017 | |
| KR | 20170085840 | A | 7/2017 | |
| KR | 20180082812 | A | 7/2018 | |
| KR | 20220078035 | A | 6/2022 | |

OTHER PUBLICATIONS

Written Opinion of the ISA for PCT/KR2023/008762 mailed Sep. 20, 2023, 5 pages.
Extended European Search Report dated Aug. 13, 2025 for EP Application No. 23846816.9.

* cited by examiner

ELECTRONIC DEVICE AND OPERATION METHOD FOR DISPLAY CONTROL BASED ON WHEEL MANIPULATION

CROSS-REFERENCE TO RELATED APPLICATIONS

This application is a continuation of International Application No. PCT/KR2023/008762 designating the United States, filed on Jun. 23, 2023, in the Korean Intellectual Property Receiving Office and claiming priority to Korean Patent Application No. 10-2022-0092608, filed on Jul. 26, 2022, in the Korean Intellectual Property Office, the disclosures of each of which are incorporated by reference herein in their entireties.

BACKGROUND

Field

The disclosure relates to an electronic device and operation method for controlling a display.

Description of Related Art

In general, a display device, such as a television, may be a device having a function of displaying an image that the user may view. The user may view various contents through a display device. The display device may output, through a display, content selected by the user among the contents served by a content providing server or broadcast selected by the user among the broadcast signals transmitted from a broadcast station.

The user may control the display device from a remote location using a control device such as a remote control. The control device is being developed in various forms other than a traditional remote control. For example, a wheel-based mouse, a touch panel-based personal portable terminal or a keyboard may be used as a control device.

With the development of the multimedia industry, services provided by display devices are rapidly increasing. Since functions to be controlled using a control device may increase, a need exists for a method capable of more control operations using a limited manipulation means.

SUMMARY

Embodiments of the disclosure may provide a device and control method for processing signals generated by wheel manipulation in an electronic device controlled by key manipulation.

Embodiments of the disclosure may provide a device and method for controlling the direction even when an application being executed on a display is unable to process wheel operations.

A method for controlling a user interface in an electronic device according to an example embodiment of the disclosure may comprise: obtaining a wheel base signal for a running application by wheel manipulation; obtaining an input signal type supported in the running application; based on the input signal type supported in the running application being a first input signal type, transferring the obtained wheel base signal to the running application; and based on the input signal type supported in the running application being a second input signal type, changing the obtained wheel base signal into a direction control signal and transferring the direction control signal to the running application.

An electronic device according to an example embodiment of the disclosure may comprise: a transceiver configured to transmit and/or receive a wheel base signal generated by wheel manipulation based on a specified communication scheme; at least one processor, comprising processing circuitry, individually and/or collectively, configured to: generate a command to perform a specific operation by the wheel base signal; obtain the wheel base signal; obtain an input signal type supported in a running application; based on the input signal type supported in the running application being a first input signal type, transfer the obtained wheel base signal to the running application; and based on the input signal type supported in the running application being a second input signal type, change the obtained wheel base signal into a direction control signal and transfer the direction control signal to the running application.

According to various example embodiments of the disclosure, as the display device converts the signal generated by wheel manipulation into a signal generated by key manipulation and processes the same, the usability of the wheel input device may be increased, and the degree of freedom for the user to select an input device may be enhanced.

Effects obtainable from the disclosure are not limited to the above-mentioned effects, and other effects not mentioned may be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar reference numerals may be used to denote the same or similar elements.

DETAILED DESCRIPTION

Hereinafter, various example embodiments of the present disclosure are described in greater detail with reference to the accompanying drawings. However, it should be appreciated that the present disclosure is not limited to the various example embodiments, and all changes and/or equivalents or replacements thereto also belong to the scope of the present disclosure. Further, the present disclosure may be implemented in other various forms and is not limited to the various example embodiments set forth herein. For clarity, components or parts irrelevant to the present disclosure may be omitted from the drawings or the detailed description.

Figure 1:
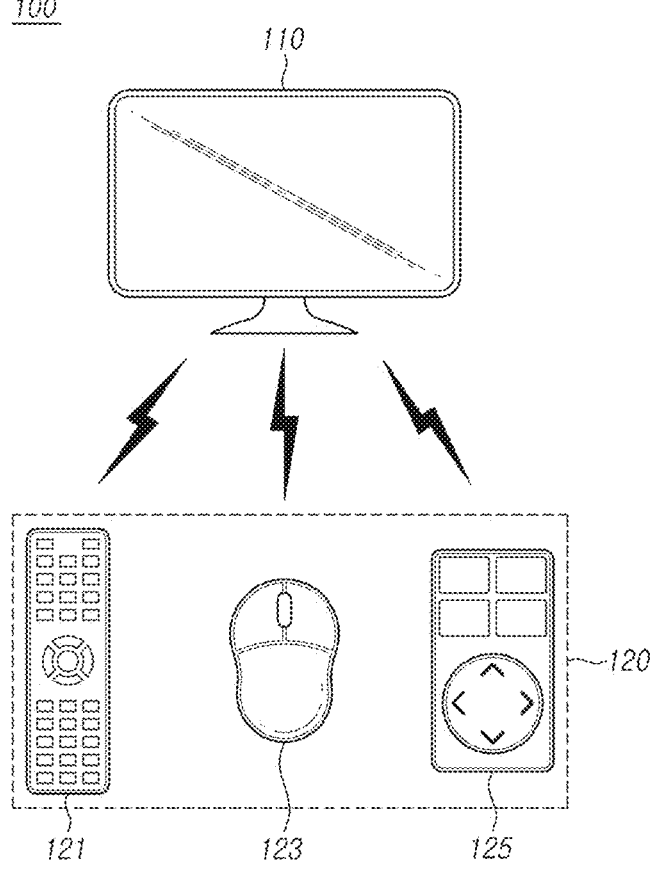
FIG. 1 is a diagram illustrating an example configuration of a display system according to various embodiments.

FIG. 1 is a diagram illustrating an example configuration of a display system 100 according to various embodiments.

Referring to FIG. 1, in an embodiment, a display system 100 may include an electronic device 110 or an input device 120. The display system 100 may be a system in which the user controls the electronic device 110 by manipulating an input device 120 having an input means such as a wheel, a physical button, or a touch panel. The input device 120 and the electronic device 110 may transmit/receive signals through a radio interface such as a radio channel. The wireless interface may transmit/receive signals according to, e.g., a radio frequency (RF) communication standard or an infrared (IR) communication standard.

The input device 120 may include at least one of a remote control 121, a mouse 123, or a wheel input device 125, but is not limited thereto. For example, although not shown in the drawings, the input device 110 may include a personal portable device, such as a keyboard or a smart phone having an application capable of controlling the electronic device 110 installed thereon. Other various types of devices may be used as the input device 120.

According to an embodiment, the remote control 121 may include a plurality of physical buttons. The remote control 121 may transfer a control signal to the electronic device 110 in response to manipulating at least one of a plurality of physical buttons by the user. The plurality of physical buttons may include, e.g., direction buttons corresponding to front, back, left, and right. As an embodiment, when one of the direction buttons is pressed by the user, the remote control 121 may transfer a control signal instructing the electronic device 110 to perform a unit operation. In an embodiment, the remote control 121 may transfer a control signal instructing the electronic device 110 to perform a continuous operation when one of the direction buttons is continuously pressed for a predetermined period of time by the user.

According to an embodiment, the mouse 123 may include a plurality of physical buttons or a wheel. The mouse 123 may transfer a control signal to the electronic device 110 in response to manipulating at least one of a plurality of physical buttons or the wheel by the user. The plurality of physical buttons may include, e.g., a left selection button or a right selection button. In an embodiment, the mouse 123 may transfer a control signal instructing the electronic device 110 to perform a unit operation or a continuous operation when the user rotates the wheel. The control signal may include information about the direction in which the wheel rotates, the number of wheel events, or information about the interval between wheel events.

According to an embodiment, the wheel input device 125 may include a plurality of physical buttons or wheel. The wheel input device 125 may transfer a control signal to the electronic device 110 in response to manipulating at least one of a plurality of physical buttons or the wheel by the user. The plurality of physical buttons may include, e.g., direction buttons corresponding to up, down, left, and right or a power POWER or volume VOLUME button. In an embodiment, the wheel input device 125 may transfer a control signal instructing the electronic device 110 to perform a unit operation or a continuous operation when the user rotates the wheel. The control signal may include information about the direction in which the wheel rotates, the number of wheel events, or information about the interval between wheel events.

The electronic device 110 may be a device having a function of displaying an image that the user may view. The electronic device 110 allows the user to view various contents. The display device may display, on the display, the broadcast selected by the user among broadcast signals transmitted from broadcasting stations.

Further, there are provided smart TVs providing various contents in addition to the broadcast function. Smart TVs aim to analyze and provide the user's desired content even without the user's manipulation rather than passively operating according to the user's selection.

The display device is not limited to those shown in the drawings, and may be implemented as various devices, such as a monitor, a laptop computer, a desktop, an e-book, a PDA, a PMP, a wearable device, a navigation device, a portable terminal, etc.

According to an embodiment, the electronic device 110 may receive a control signal from the input device 120 through a wireless channel. The electronic device 110 may control operations such as changing the channel or volume based on a control signal, selecting one of a plurality of items (or objects) displayed on the screen, or changing the playback section of video. The control signal may be different according to the type of input device 120. The type of the input device 120 may be classified according to the user's operation method, for example. The input device 120 may include a remote control 121 that uses physical keys manipulatable by the user's pressing as an input means or a mouse 123 or wheel input device 125 that uses a wheel manipulatable by the user's rotating as an input means.

In an embodiment, the mouse 123 or wheel input device 125 that uses a wheel as input means may generate a control signal by the direction and/or angle of rotation of the wheel. The electrical signal generated by the mouse 123 or the wheel input device 125 may include a wheel base signal due to the rotation angle.

Figure 2:
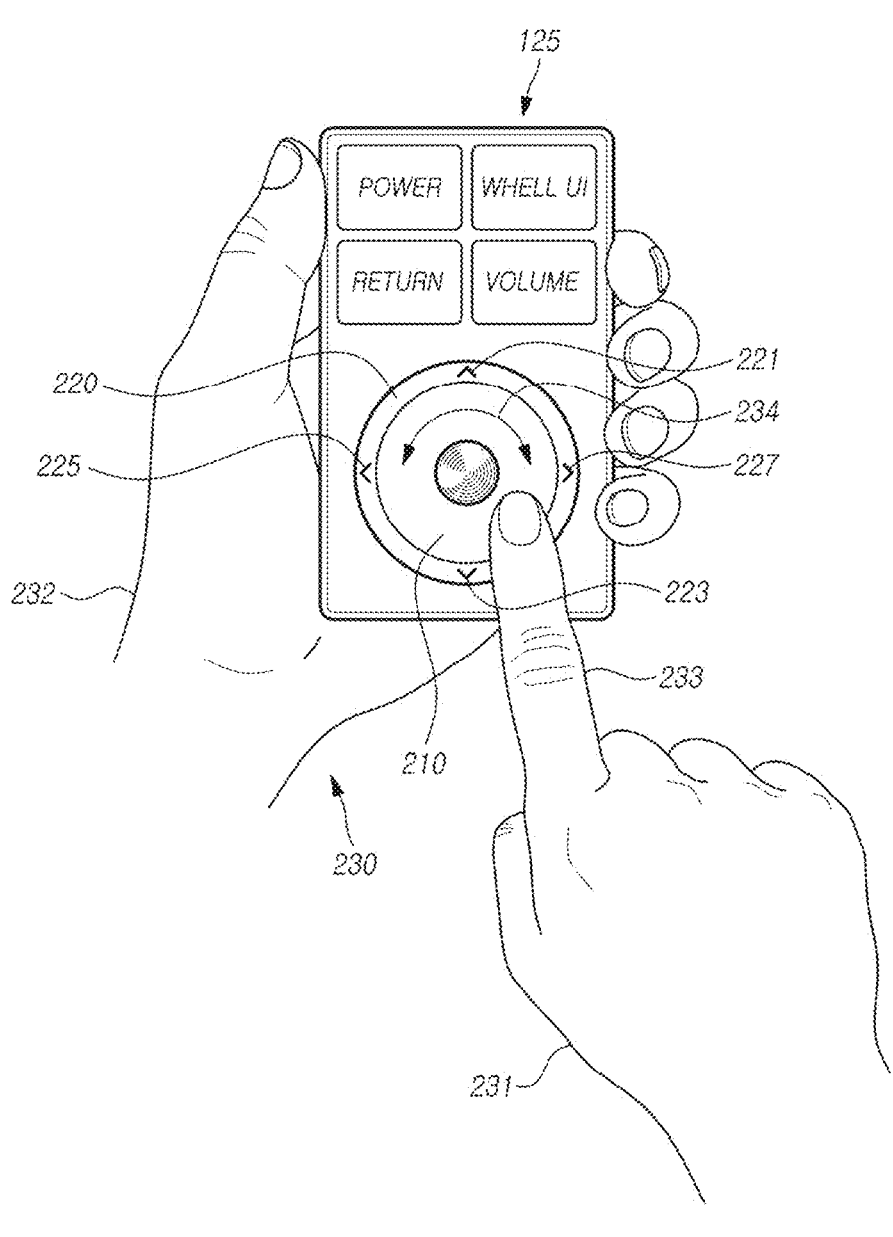
FIG. 2 is a diagram illustrating an example in which a user uses a wheel input device according to various embodiments.

FIG. 2 is a diagram illustrating an example in which the user uses a wheel input device (e.g., the wheel input device 125 of FIG. 1) according to various embodiments.

Referring to FIG. 2, in an embodiment, the wheel input device 125 may include a wheel input 210 rotatable about one axis, a plurality of function buttons (e.g., a power button POWER, a wheel user interface button WHEEL UI, a return button RETURN, or a volume button VOLUME) or function buttons provided on the wheel input 210.

In an embodiment, the user 230 may hold the wheel input device 125 in one hand (e.g., left hand 232) and manipulate the wheel input 210 or physical buttons provided in the wheel input device 125 with the other hand (e.g., right hand 231). As an example, the user 230 may rotate the wheel input 210 provided in the wheel input device 125 clockwise (clockwise direction) or counterclockwise (counterclockwise direction) with at least one right finger (e.g., the index finger 233 of the right hand 231) while holding the wheel input device 125 in the left hand 232.

According to an embodiment, the wheel input device 125 may continuously be operated by the circular movement of the finger 233 in the arrow (234) direction indicated on the wheel input device 210. For example, the wheel input 210 of the wheel input device 125 may be rotated about a virtual axis by the circular movement of the finger 233. For example, the wheel input 210 of the wheel input device 125 may be rotated 360 degrees or more without stop by the manipulation of the user 230 using the finger 233. This type of movement (e.g., rotation of the wheel input 210) may generate, by an incremental operation (e.g., unit operation) or accelerating operation (e.g., continuous operation), a plurality of objects (or items) displayed on the display provided in the display device (e.g., the electronic device 110 of FIG. 1) or a list including the plurality of objects. The incremental operation (e.g., unit operation) may be, e.g., the operation of sequentially selecting a plurality of objects (or items) according to, e.g., the manipulation of the wheel input device 125. The accelerating operation (e.g., continuous operation) may be, e.g., the operation of selecting a target object (or item) while skipping a predetermined interval for the plurality of objects (or items) according to the manipulation of the wheel input device 125.

According to an embodiment, if the wheel input 210 of the wheel input device 125 is rotated a desired angle or more at the reference speed or more, one or more wheel events may occur. The wheel event may correspond to an event that generates a wheel base signal, e.g., whenever the wheel input 210 is rotated by a predetermined angle $\alpha$. The wheel base signal may be a pulse signal generated as the wheel input 210 is rotated a predetermined angle $\alpha$. The wheel input device 125 may configure wheel event data by information regarding one or more wheel events. The wheel input device 125 may provide the wheel event data to the electronic device 110. The electronic device 110 may obtain information regarding one or more wheel events from the wheel event data. The electronic device 110 may identify that the wheel input 210 has been rotated by a desired angle or more at the reference speed or more based on the information regarding one or more wheel events. Upon identifying that the wheel input 210 has been rotated the desired angle or more at the reference speed or more, the electronic device 110 may perform an accelerating operation (e.g., continuous operation).

According to an embodiment, if the wheel input 210 of the wheel input device 125 is not rotated more than the desired angle or is rotated the desired angle or more at less than the reference speed, the wheel event data generated thereby may be provided to the electronic device 110. In this case, the electronic device 110 may identify that the wheel input 210 is not rotated more than the desired angle or is rotated the desired angle or more at less than the reference speed based on the wheel event data. Upon identifying that the wheel input 210 is not rotated more than the desired angle or is rotated the desired angle at less than the reference speed, the electronic device 110 may perform an incremental operation (e.g., unit operation).

As described above, the electronic device 110 may perform differentiated control considering the speed at which the user 230 rotates the wheel input 210 provided in the wheel input device 125. In an embodiment, the electronic device 110 may perform a continuous operation and display the result through the display when the wheel input 210 is rotated at a fast speed by a predetermined (e.g., specified) angle $\alpha$ or may perform a unit operation when the wheel input 210 is rotated at a non-fast speed by the predetermined angle $\alpha$. The predetermined angle $\alpha$ may be a rotational angle at which the wheel input device 125 may generate a predetermined number of wheel events (e.g., wheel base signal generation). The rapid speed may correspond to a case where the entire required time from the start of rotation of the wheel input 210 to the end of the rotation or the average interval of inter-wheel event intervals is shorter than a preset reference interval. The interval may be a time interval from when a wheel event occurs to when the next wheel event occurs.

In an embodiment, the wheel input device 125 may include a key input 220. The key input 220 may include an up key 221, a down key 223, a left key 225, or a right key 227. The key input 220 may be disposed as a physical button or a touch button, but is not limited thereto.

In an embodiment, the wheel input may have various shapes. Although a circular wheel input is disclosed in the drawings, the disclosure is not limited thereto, and various shapes such as an elliptical shape or a rectangular shape may be included.

In an embodiment, the key input or the wheel input may be disposed in a separate space in the control device. In the disclosure, key inputs are disposed at positions corresponding to east, west, south, and north with respect to the center of the wheel input, but the disclosure is not limited thereto, and the key inputs may be disposed separately from the wheel input.

In an embodiment, in addition to the operation of rotating (234) the wheel input 220 clockwise or counterclockwise, the user 230 may control the user interface such as moving the focus indicating a selection item in the direction (e.g., up, down, left and right) desired by the user 230 by pressing the key input 220.

Figure 3:
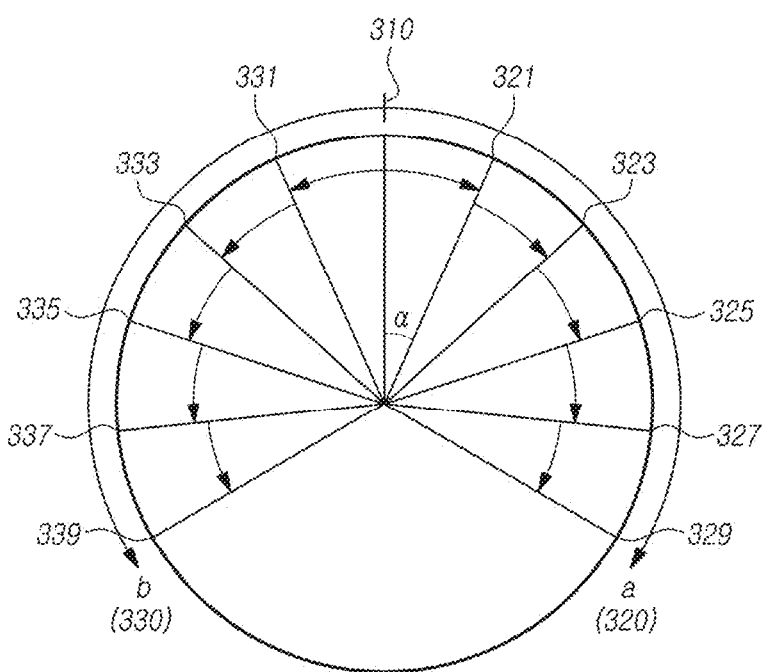
FIG. 3 is a diagram illustrating an example of wheel manipulation by a user in a wheel input device according to various embodiments.

FIG. 3 is a diagram illustrating an example of wheel (e.g., the wheel input 210 of FIG. 2) manipulation by a user (e.g., the user 230 of FIG. 2) in a wheel input device (e.g., the wheel input device 125 of FIG. 1) according to various embodiments.

Referring to FIG. 3, in an embodiment, the wheel input 210 may have a structure capable of rotating in one of a clockwise direction a 320 or a counterclockwise direction b 330 by manipulation of the user 230.

According to an embodiment, the wheel input device 125 may determine that a wheel event occurs whenever the wheel input device 210 is rotated by a predetermined angle $\alpha$ in one of the clockwise (a) 320 or the counterclockwise (b) 330. The predetermined angle $\alpha$ may be preset considering the sensitivity of the wheel operation. The sensitivity of the wheel operation may increase as the angle at which the occurrence of the wheel event is to be detected is set to be narrower, and may decrease as the angle at which the occurrence of the wheel event is to be detected is set to be wider.

In an embodiment, rotation of the wheel input 210 in the wheel input device 125 may be performed in the clockwise rotation section 360. The clockwise rotation section 360 may be a section in which the wheel input 210 rotates in the clockwise direction (a) 320 through one continuous manipulation (e.g., rotation manipulation) by the user 230. The clockwise rotation section 360 may be determined as a start position and an end position at which the wheel input 210 starts and ends rotation in the clockwise (a) 320. For example, when the clockwise rotation of the wheel input 210 starts at the first position 310 and stops at the second position 329, the clockwise rotation section 360 may be from the first position 310 to the second position 329. In the clockwise rotation section 360, electrical signals corresponding to five clockwise wheel events 321, 323, 325, 327, and 329 are generated. The clockwise wheel events 321, 323, 325, 327, and 329 may be wheel events that occur when the wheel input 210 rotates at the predetermined angle α in the clockwise direction, i.e., the clockwise direction (a) 320. The five clockwise wheel events 321, 323, 325, 327, and 329 may include a first clockwise wheel event 321 corresponding to generation of a first clockwise electrical signal, a second clockwise wheel event 323 corresponding to generation of a second clockwise electrical signal, a third clockwise wheel event 325 corresponding to generation of a third clockwise electrical signal, a fourth clockwise wheel event 327 corresponding to generation of a fourth clockwise electrical signal, or a fifth clockwise wheel event 329 corresponding to generation of a fifth clockwise electrical signal.

In an embodiment, rotation of the wheel input 210 in the wheel input device 125 may be performed in the counterclockwise rotation section 370. The counterclockwise rotation section 370 may be a section in which the wheel input 210 rotates in the counterclockwise direction (b) 330 through one continuous manipulation (e.g., rotation manipulation) by the user 230. The counterclockwise rotation section 370 may be determined as a start position and an end position at which the wheel input 210 starts and ends rotation in the counterclockwise direction (b) 330.

For example, when the counterclockwise rotation of the wheel input 210 starts at the first position 310 and stops at the third position 339, the counterclockwise rotation section 370 may be from the first position 310 to the third position 339. In the forward rotation section 360, electrical signals corresponding to five counterclockwise wheel events 331, 333, 335, 337, and 339 are generated. The counterclockwise wheel events 331, 333, 335, 337, and 339 may be, e.g., wheel events that occur when the wheel input 210 rotates at a predetermined angle α in the counterclockwise direction, i.e., the counterclockwise direction (b) 330. The five counterclockwise wheel events 331, 333, 335, 337, and 339 may include a first counterclockwise wheel event 321 corresponding to generation of a first counterclockwise electrical signal, a second counterclockwise wheel event 333 corresponding to generation of a second counterclockwise electrical signal, a third counterclockwise wheel event 335 corresponding to generation of a third counterclockwise electrical signal, a fourth counterclockwise wheel event 337 corresponding to generation of a fourth counterclockwise electrical signal, or a fifth counterclockwise wheel event 339 corresponding to generation of a fifth counterclockwise electrical signal.

According to an embodiment, when a wheel event occurs in which the wheel input 210 rotates in one of the clockwise (a) 320 or the counterclockwise (b) 330, the wheel input device 125 may provide the wheel event data to the electronic device 110. The wheel event data may include, e.g., rotation direction information indicating the rotation direction (e.g., the clockwise direction (a forward direction) or the counterclockwise direction (a reverse direction)) of the wheel 210 or wheel event information according to rotation at the predetermined angle α. The wheel event information may be a pulsed electrical signal. For example, the wheel event information may be a signal in which a pulse is triggered at a time when an electrical signal corresponding to the wheel event is generated. The wheel event data may be defined as a wheel base signal.

Figure 4:
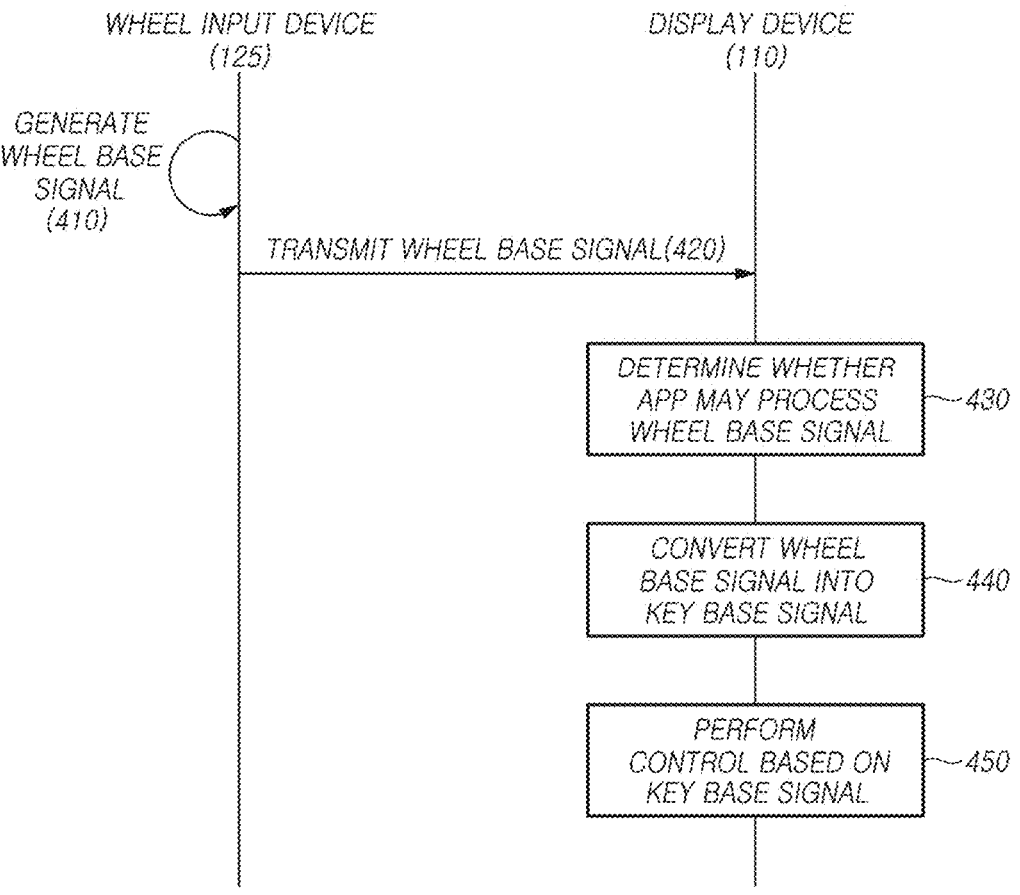
FIG. 4 is a signal flow diagram illustrating example signaling in a display system according to various embodiments.

FIG. 4 is a signal flow diagram illustrating example signaling in a display system (e.g., the display system 100 of FIG. 1) according to various embodiments.

Referring to FIG. 4, in operation 410, the wheel input device 125 may generate a wheel base signal by rotation (e.g., rotation 234 of the wheel input of FIG. 2) of the wheel input (e.g., 210 of FIG. 2) by the user (e.g., the user 230 of FIG. 2). The wheel base signal may be generated by rotation in a predetermined rotation direction or rotation angle. The wheel base signal may be generated by, e.g., rotating clockwise or counterclockwise by the predetermined angle α. The wheel base signal may correspond to an electrical signal.

In operation 420, the wheel input device 125 may transmit the wheel base signal to the electronic device 110. The wheel input device 125 may transmit the wheel base signal through a transceiver (e.g., the transceiver 520 of FIG. 5). The electronic device 110 may obtain the wheel base signal transmitted by the wheel input device 125. The electronic device 110 may obtain the wheel base signal through the transceiver (e.g., the transceiver 620 of FIG. 6).

In operation 430, the electronic device 110 may determine whether the wheel base signal obtained from the running application may be processed. The determining operation may be performed by a processor (e.g., the processor 610 of FIG. 6) of the electronic device 110. Whether to process may correspond to, e.g., whether the application may apply the obtained wheel base signal within the application without conversion.

When it is determined that the running application is unable to process the wheel base signal, in operation 440, the electronic device 110 may convert the obtained wheel base signal into a key base signal. The conversion operation may be performed by the processor (610 of FIG. 6). The key base signal may correspond to an electrical signal generated when the user manipulates the key input device (e.g., the key input device 220 of FIG. 2).

In operation 450, the electronic device 110 may perform control according to the converted key base signal. The control operation may be performed by the processor (610 of FIG. 6). When the key base signal is a direction control signal, the direction control signal may be used to control a currently indicated selection item to move by a unit operation in an upward direction, a downward direction, a left direction, or a right direction.

Figure 5:
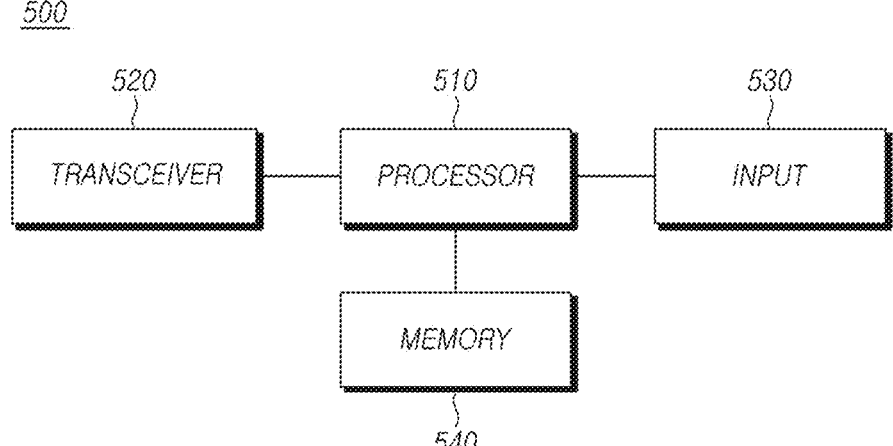
FIG. 5 is a block diagram illustrating an example configuration of a wheel input device according to various embodiments.

FIG. 5 is a block diagram illustrating an example configuration of a wheel input device (e.g., the wheel input device 125 of FIG. 1) according to various embodiments.

Referring to FIG. 5, according to an embodiment, the wheel input device 500 may include at least one processor (e.g., including processing circuitry) 510, a transceiver 520, an input (e.g., including circuitry) 530, and/or a memory 540. Although not shown, the wheel input device 500 may further include a display. In order to provide other additional functions, the wheel input device 500 may further include at least one component not shown.

The processor 510 may include various processing circuitry and control all the matters related to the control of the wheel input device 500. The processor 510 may transmit a signal corresponding to the manipulation of a predetermined key input (e.g., the key input 220 of FIG. 2) of the input 530 or the manipulation of a wheel input (e.g., the wheel input 210 of FIG. 2) or a signal corresponding to a movement of the wheel input device 500 to an electronic device (e.g., the electronic device 110 of FIG. 1) through the transceiver 520. In an embodiment, when the processor 510 receives the activation signal from the electronic device 110, the processor 510 may transmit the control signal corresponding to the wheel input or the key input detected by the input 530 to the electronic device 110. The processor 510 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The transceiver 520 may transmit and receive signals to and from the electronic device 110. The signal transmitted to the electronic device 110 by the transceiver 520 may be, e.g., a signal generated when a physical button provided on a remote control (e.g., the remote control 121 of FIG. 1) is manipulated by the user (e.g., the user 230 of FIG. 2) or a wheel (e.g., the wheel input 210 of FIG. 2) provided on a wheel input device (e.g., the wheel input device 125 of FIG. 1) is manipulated. In an embodiment, the transceiver 520 may be a wireless transceiver that transmits and receives signals through a wireless interface such as a wireless channel. In this case, the transceiver 520 may include an radio frequency (RF) module capable of transmitting and receiving a radio signal to and from the electronic device 110 according to an RF communication standard. For example, the transceiver 520 may include an infrared (IR) module capable of transmitting and receiving signals to and from the electronic device 110 according to an infrared communication standard. In this case, the transceiver 520 may transmit a command for performing functions such as power on/off, channel change, volume change, and item selection to the electronic device 110 through the IR module if necessary. Further, the input device 120 may include an IR module or a Bluetooth module capable of transmitting and receiving signals to and from the display device 100 according to IR or Bluetooth communication standards.

The input 530 may include various circuitry including at least one component for receiving information according to the user's (e.g., user 230 of FIG. 2) manipulation, such as a keypad, button, wheel key, touch pad, or touchscreen. The input 530 may input a command related to the electronic device 110 by manipulation of the user 230. When the input 530 includes a hard key (e.g., the function button or the key input 220 of FIG. 2) that is a physical button, the user 230 may input a command related to the display device 700 to the input device 120 by pressing the hard key. When the input 530 includes a wheel (e.g., the wheel input 210 of FIG. 2), the input 530 may generate an electrical signal corresponding to one or several wheel events (e.g., the forward wheel events 321, 323, 325, 327, and 329 or the reverse wheel events 331, 333, 335, 337, and 339 of FIG. 3) by rotating the wheel 210 in the clockwise direction (e.g., the clockwise direction (a) 320 of FIG. 3) or the counterclockwise direction (e.g., the counterclockwise direction (b) 330 of FIG. 3) by manipulation of the user 230. The wheel input 210 manipulated by the user 230 may be implemented as an image displayed on the touch pad rather than a physical component. In this case, a wheel event may be generated in response to a rotation motion (drag) after a touch by the user 230.

In an embodiment, when an input of the wheel input 210 by the manipulation of the user 230 is detected, the input 530 may sense values such as the rotation direction, the number of rotations, and the rotation angle corresponding to the input. In response to receiving the activation signal from the electronic device 110, the input 530 may sense the value corresponding to wheel event information such as the rotation direction, the number of rotations, and the rotation angle corresponding to the rotation of the wheel input 210.

The memory 540 may store various types of programs, application data, or the like necessary for controlling or operating the wheel input device 500. In an embodiment, the memory 540 may temporarily or permanently store the value corresponding to wheel event information such as the rotation direction, the number of rotations, and the rotation angle according to the wheel event caused by the user 230 manipulating the wheel input 210. The memory 540 may manage wheel event information such as the rotation direction, the number of rotations, and the rotation angle in the database, thereby providing the wheel event information to be utilized when the wheel input device 500 operates thereafter.

The configuration of the wheel input device 500 illustrated in FIG. 5 is merely an example, and each component may be integrated, added, or omitted according to the specifications of the wheel input device 500 actually implemented. In other words, if necessary, two or more components may be combined into one component, or one component may be subdivided into two or more components. Further, the function performed by each component is for describing an embodiment, and the specific operation or function may be modified as needed, but the disclosure is not limited thereto.

Figure 6:
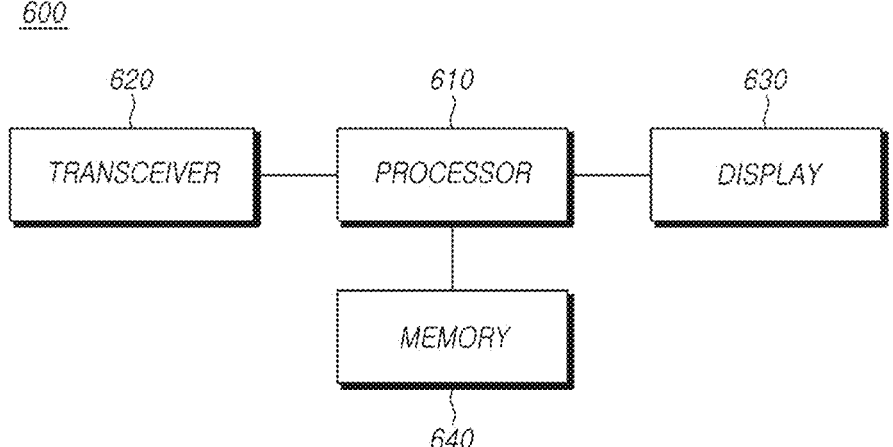
FIG. 6 is a block diagram illustrating an example configuration of an electronic device according to various embodiments.

FIG. 6 is a block diagram illustrating an example configuration of an electronic device 600 (e.g., the electronic device 110 of FIG. 1) according to various embodiments.

Referring to FIG. 6, in an embodiment, the electronic device 600 may include at least one processor (e.g., including processing circuitry) 610, a transceiver 620, a display 630, and/or a memory 640.

The processor 610 according to an embodiment may include various processing circuitry and controls the overall operation of the electronic device 600 and a signal flow between internal components of the electronic device 600, and performs a function of processing data. When there is a user input or a preset and stored condition is met, the processor 610 may execute an operation system (OS) and various applications stored in the memory 640.

The processor 610 according to an embodiment may determine whether the electronic device 600 is in a controllable state by a wheel key input, and when the electronic device 600 is in the controllable state by the wheel key input, the processor 610 may control the transceiver 620 to transmit an activation signal to the control device. In response to the activation signal, various interactions suitable for the current circumstance may be determined based on the received control signal and the circumstance information about the screen displayed on the display 630. Further, the processor 610 may control the operation of the electronic device 600 according to the determined interaction.

The processor 610 according to an embodiment may include one or more processors and a memory. For example, the one or more processors may execute one or more programs stored in the memory, and the processor may include a single core, a dual core, a triple core, a quad core, or multiple cores thereof. The processor 610 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

According to an embodiment, the processor 610 may determine whether the electronic device 600 is in the controllable state by the wheel input device 125. If the display device 700 is in a state controllable by the wheel input device 125, the processor 610 may control the transceiver 620 to transmit a control signal for activating the wheel input device 125 to the wheel input device 125. The processor 610 may receive a control signal, such as wheel event information, from the wheel input device 125. The processor 610 may determine various interactions suitable for the current circumstance, based on the control signal such as wheel event information received from the wheel input device 125 and circumstance information about the screen displayed on the display 630. In an embodiment, the processor 610 may control the electronic device 600 to perform one of a unit operation or a continuous operation according to the determined interaction.

The processor 610 according to an embodiment may obtain a wheel base signal through the transceiver 620. The processor 610 may determine whether the running application is capable of processing the wheel base signal. The processor 610 may control the user interface according to the wheel base signal in response to determining that the running application is capable of processing the wheel base signal. The processor 610 may convert the wheel base signal into a key base signal in response to determining that the running application is unable to process the wheel base signal. The converted key base signal may be output as a direction control signal for controlling focus movement for selecting one of a plurality of target objects displayed on the display.

In an embodiment, the processor 610 may store information about the input device and output the direction control signal. The processor 610 may store information about the input device in the memory 640. The information about the input device may include, e.g., first signal information or second signal information. The first signal information may include direction information (e.g., counterclockwise rotation or clockwise rotation) about the wheel base signal or information indicating that it is an electrical signal generated by manipulation of the wheel input (e.g., the wheel input 210 of FIG. 2) of the user. The second signal information may include direction information (e.g., an upward direction, a downward direction, a left direction, or a right direction) about a key base signal or information indicating that it is an electrical signal generated by manipulation of a key input (e.g., the key input 220 of FIG. 2) of the user.

In an embodiment, the wheel base signal may include a first wheel base signal or a second wheel base signal. The processor 610 may obtain, as the first wheel base signal, an electrical signal generated as the wheel input (e.g., the wheel input 220 of FIG. 2) is rotated counterclockwise by manipulation of the user (e.g., the user 230 of FIG. 2). The processor 610 may obtain an electrical signal generated as the wheel input 220 is rotated clockwise by the user's manipulation as the second wheel base.

In an embodiment, the key base signal may include a first key base signal, a second key base signal, a third key base signal, or a fourth key base signal. The processor 610 may obtain, as the first key base signal, an electrical signal generated when the up key (e.g., the up key 221 of FIG. 2) is pressed by the manipulation of the user 230. The processor 610 may obtain, as the second key base signal, an electrical signal generated when a down key (e.g., the down key 223 of FIG. 2) is pressed by the manipulation of the user 230. The processor 610 may obtain, as the third key base signal, an electrical signal generated when the up key (e.g., the left key 225 of FIG. 2) is pressed by the manipulation of the user 230. The processor 610 may obtain, as the fourth key base signal, an electrical signal generated when the right key (e.g., the right key 227 of FIG. 2) is pressed by the manipulation of the user 230.

In an embodiment, the processor 610 may output the first key base signal as a first direction control signal. The processor 610 may control to move the currently indicated selection item upward by a unit operation using the output first direction control signal. The processor 610 may output the second key base signal as the second direction control signal. The processor 610 may control to move the currently indicated selection item downward by a unit operation using the output second direction control signal. The processor 610 may output the third key base signal as the third direction control signal. The processor 610 may control to move the currently indicated selection item in the left direction by a unit operation using the output third direction control signal. The processor 610 may output the fourth key base signal as the fourth direction control signal. The processor 610 may control to move the currently indicated selection item by a unit operation in the right direction using the output fourth direction control signal.

In an embodiment, the processor 610 may determine an arrangement direction of a plurality of target objects of the running application. The arrangement direction may include a horizontal direction or a vertical direction.

According to an embodiment, if the running application is determined to be unable to process the wheel base signal, and the arrangement direction is the vertical direction, the first wheel base signal may be output as the first direction control signal. If the running application is determined to be unable to process the wheel base signal, and the arrangement direction is the vertical direction, the second wheel base signal may be output as the second direction control signal. If the running application is determined to be unable to process the wheel base signal, and the arrangement direction is the horizontal direction, the first wheel base signal may be output as the third direction control signal. If the running application is determined to be unable to process the wheel base signal, and the arrangement direction is the horizontal direction, the fourth wheel base signal may be output as the fourth direction control signal.

According to an embodiment, the processor 610 may determine the position of the target object currently indicated among the plurality of target objects of the user interface of the running application. The processor 610 may determine whether the position of the target object is positioned at an end.

In an embodiment, if the processor 610 determines that the running application is unable to process the wheel base signal and determines that the arrangement direction is the vertical direction and the position of the target object is at the upper end, the processor 610 may output the obtained first base signal as the fifth direction control signal. The processor 610 may control to move the focus indicating the target object to the lower end of the left row through the fifth direction control signal. if the processor 610 determines that the running application is unable to process the wheel base signal and determines that the arrangement direction is the vertical direction and the position of the target object is at the lower end, the processor 610 may output the obtained second base signal as the sixth direction control signal. The processor 610 may control to move the focus indicating the target object to the upper end of the right row through the sixth direction control signal. if the processor 610 determines that the running application is unable to process the wheel base signal and determines that the arrangement direction is the horizontal direction and the position of the target object is at the left end, the processor 610 may output the obtained first base signal as the seventh direction control signal. The processor 610 may control to move the focus indicating the target object to the right end of the upper row through the seventh direction control signal. If the processor 610 determines that the running application is unable to process the wheel base signal and determines that the arrangement direction is the horizontal direction and the position of the target object is at the right end, the processor 610 may output the obtained first base signal as the eighth direction control signal. The processor 610 may control to move the focus indicating the target object to the left end of the lower row through the eighth direction control signal.

The transceiver 620 according to an embodiment may include one or more components for performing communication between the electronic device 600 and an external device (e.g., the input device 120 of FIG. 1). For example, the transceiver 620 may transmit an activation signal to the input device 120 using short-range communication, and may receive a control signal corresponding to a wheel key input from the input device 120. In this case, the short-range communication may include, but is not limited to, a Wi-Fi method, an NFC method, a Bluetooth method, an infrared method, a Zigbee method, or the like.

The display 630 according to an embodiment generates a driving signal by converting an image signal, a data signal, an OSD signal, a control signal, etc. processed by the processor 610. The display 630 may be implemented as a PDP, an LCD, an OLED, a flexible display, or the like, and may also be implemented as a three-dimensional (3D) display. Further, the display 630 may be configured as a touch screen and used as an input device in addition to an output device. As an embodiment, the screen changed according to the determined interaction may be displayed, but is not limited thereto.

The memory 640 may store various data, programs, or applications for driving and controlling the electronic device 600 under the control of the processor 610. The memory 640 may include a broadcast reception module, a channel control module, a volume control module, a communication control module, a voice recognition module, a motion recognition module, a light reception module, a display control module, an audio control module, an external input control module, a power control module, a power control module of an external device connected wirelessly (e.g., Bluetooth), a voice database (DB), or a motion database (DB) which is not shown. The not shown modules and database of the memory 640 may be implemented as software to perform a broadcast reception control function, a channel control function, a volume control function, a communication control function, a voice recognition function, a motion recognition function, a light reception control function, a display control function, an audio control function, an external input control function, a power control function, or a power control function of an external device connected wirelessly (e.g., Bluetooth) in the electronic device 600.

The configuration of the electronic device 600 of FIG. 6 is merely an example, and the electronic device 600 may have some components integrated or may add or omit some components depending on its actual implementation. In other words, if necessary, two or more components may be combined into one component, or one component may be subdivided into two or more components. Further, the function performed by each component is for describing an embodiment, and the specific operation or function may be modified as needed, but the disclosure is not limited thereto.

According to an embodiment, the electronic device 600 may further include, for example, and without limitation, a tuner, a video processor, a detector, or a microphone.

The tuner may tune and select only the frequency of the channel to be received by the electronic device 600 among many radio components, by amplifying, mixing, and resonating the broadcast signals wirelessly received. The broadcast signal may include audio, video, or additional information (e.g., electronic program guide (EPG)). The tuner may receive the broadcast signal in the frequency band corresponding to the channel number according to a user input (e.g., the control signal received from the control device, e.g., channel number input, channel up/down input and channel input on the EPG screen). The tuner may receive broadcast signals from various sources, such as terrestrial broadcasts, cable broadcasts, satellite broadcasts, Internet broadcasts, and the like. The tuner may receive broadcast signals from a source, such as analog broadcasting or digital broadcasting.

The video processor may perform processing on the video data received by the electronic device 600. The video processor may perform various types of image processing, such as decoding, scaling, noise filtering, frame rate conversion, or resolution conversion, on the video data.

The detector may receive the light signal (including a control signal) received from the external control device (e.g., the input device 120 of FIG. 1) through a receiving portion, such as a light window (not shown) in the bezel of the display 630. The detector may receive a light signal corresponding to the user input (e.g., touch, press, touch gesture, voice, or motion) from the input device 120. The detector detects the user's voice, the user's video, or the user's interaction. The detector according to an embodiment may include a microphone for receiving the user's uttered voice. The microphone may convert the received voice into an electrical signal and output it to the processor 610. The detector may also detect the user input and transfer the detected signal to the processor 610. The detector may detect user inputs, such as channel-up/down, power on/off, channel selection, and screen setting, from the wheel input device 120. As an example, the detector may detect input of a control signal according to wheel manipulation provided in the wheel input device 125.

Figure 7:
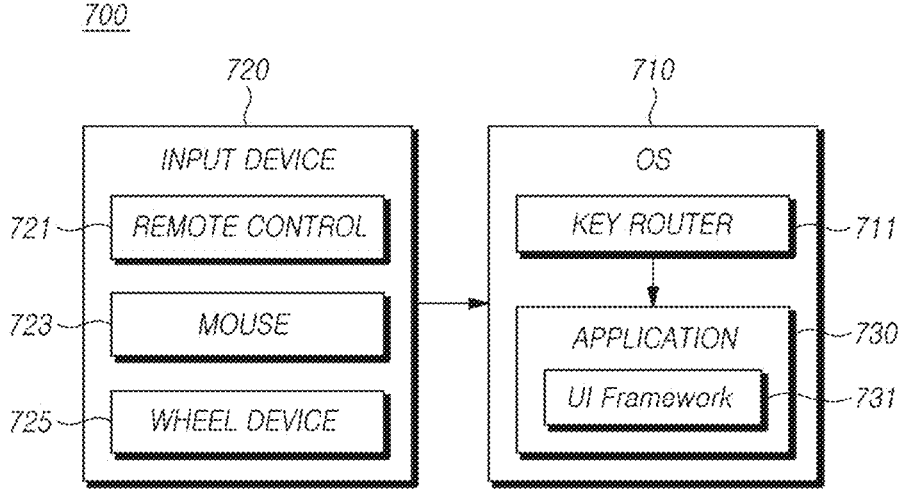
FIG. 7 is a diagram illustrating example flow of signaling processing in a display system according to various embodiments.

FIG. 7 is a diagram illustrating example flow of signaling processing in a display system according to various embodiments.

Referring to FIG. 7, in an embodiment, the input device 720 may include a remote control 721, a mouse 723, and/or a wheel input device 725. Although not shown, the input device may include a keyboard, a touch pad, a touch input of an image display device, a joystick, or the like. An electrical signal may be generated in the input device 720 by the user (e.g., the user 230 of FIG. 2). The electrical signal may include, e.g., a wheel base signal through rotation (e.g., rotation 234 of the wheel input of FIG. 2) of the wheel input (e.g., wheel input 210 of FIG. 2) of the user or a key base signal through direction key input (e.g., pressing the key input 220 of FIG. 2). Further, electrical signals may be generated by clicking or pressing a button of a mouse by the user.

In an embodiment, the operating system (OS) 710 in the electronic device (e.g., the electronic device 110 of FIG. 1) may include a key router 711. The operating system 710 may manage the signal generated by the input device 720. The operating system 710 may support an application 730. The key router 711 may process a signal generated by the input device 720. The key router 711 may transmit the generated signal to the application 730.

The key router 711 may process a signal generated by the input device 720 (e.g., the input device 120 of FIG. 1). The input device 720 may include a remote control 721 (e.g., the remote control 121 of FIG. 1), a mouse 723 (e.g., the mouse 123 of FIG. 1), or a wheel device 725 (e.g., the wheel device 125 of FIG. 1). The key router 711 may process, e.g., an electrical signal generated by the input device 720.

In an embodiment, the key router 711 may convert the wheel base signal into a direction control signal according to the key base signal. By converting the wheel base signal into a direction control signal according to the key base signal, control may be performed without a separate code change in the running application. The direction control signal includes, e.g., a first direction control signal, a second direction control signal, a third direction control signal, a fourth direction control signal, a fifth direction control signal, a sixth direction control signal, a seventh direction control signal, and an eighth direction control signal. The key router 711 may transmit the output first to eighth direction control signals to the application 730. The key router 711 may perform control to move the focus indicating any one of the plurality of target objects in the user interface of the application 730 through the first direction control signal to the eighth direction control signal. In an embodiment, the application 730 may obtain the generated signal and output it as a control signal. The control signal may include direction control for moving the selection item. The operation in which the application 730 obtains a signal processed by the key router 711 and outputs the signal as a direction control signal may be applied differently to a case in which the application 730 directly implements a layout and a case in which a component provided by the UI framework 731 is used. For example, when the layout is directly implemented in the application 730, the application 730 may determine the layout configuration and output the direction control signal to move the focus indicating the selection item. When the component provided by the UI framework 731 is used, the UI framework 731 may determine a layout and output the direction control signal to move the focus indicating the selection item.

Figure 8:
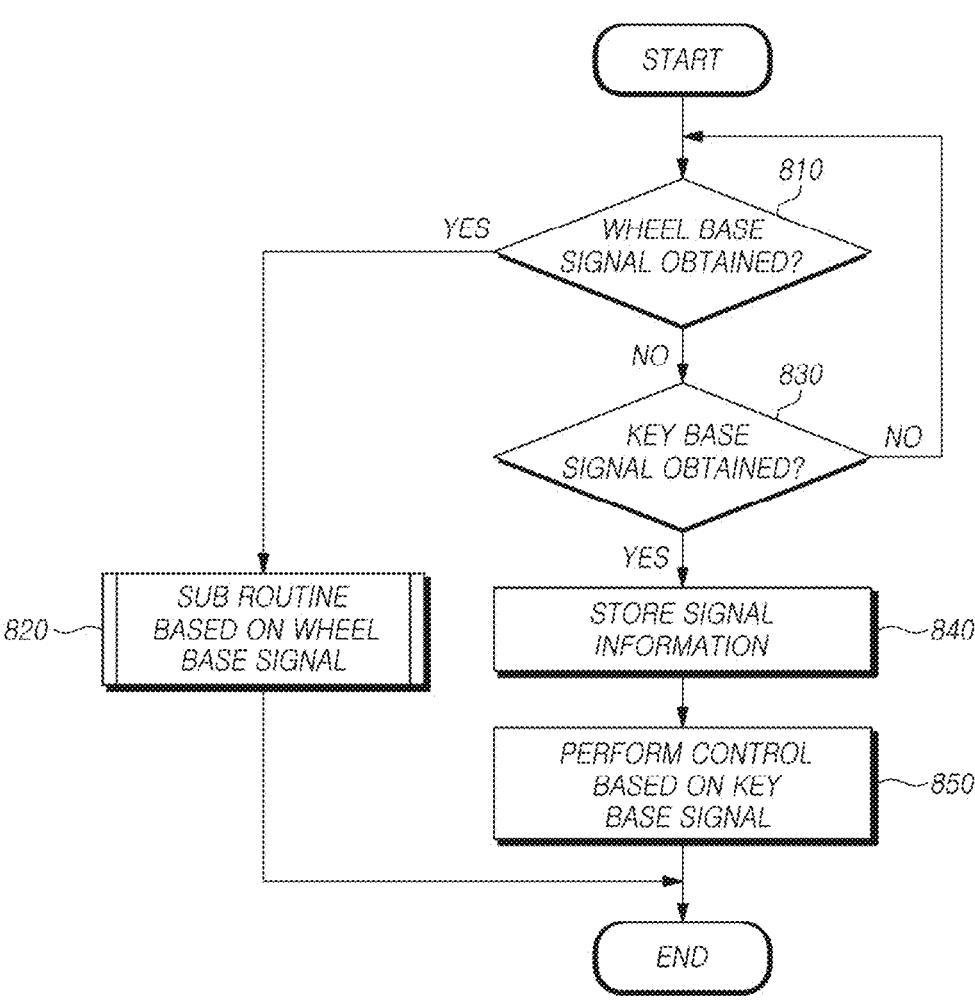
FIG. 8 is a flowchart illustrating example operations performed in an electronic device according to various embodiments.

FIG. 8 is a flowchart illustrating example operations performed by an electronic device (e.g., the electronic device 110 of FIG. 1) according to various embodiments.

Referring to FIG. 8, in an embodiment, a display system (e.g., the display system 100 of FIG. 1) may include an electronic device (e.g., the electronic device 110 of FIG. 1) or an input device (e.g., the input device 120 of FIG. 1). If the user (e.g., the user 230 of FIG. 2) manipulates a wheel input device (e.g., the wheel input device 125 of FIG. 1), an electrical signal may be generated. The electrical signal may include a wheel base signal or a key base signal. The wheel base signal may be generated as the user 230 rotates the wheel input (e.g., the wheel input 210 of FIG. 2) clockwise or counterclockwise by a predetermined angle.

In step 810, the electronic device 110 may determine whether a wheel base signal is obtained.

In operation 820, in response to determining that the wheel base signal is obtained, the electronic device 110 may perform a sub routine operation according to the wheel base signal. The sub routine operation is described in greater detail below with reference to FIG. 9.

In step 830, the electronic device 110 may determine whether a key base signal is obtained. The key base signal may be, e.g., a signal generated from the key input device as the user 230 manipulates a physical button provided in the key input device (e.g., the remote control 121 of FIG. 1).

In response to determining that the key base signal is obtained in operation 840, the electronic device 110 may store information about the key base signal. The information about the key base signal may be defined as second signal information. The second signal information may be stored in a memory (e.g., the memory 640 of FIG. 6) of the electronic device 110. The second signal information may include direction information (e.g., an upward direction, a downward direction, a left direction, or a right direction) about a key base signal or information indicating that it is an electrical signal generated by manipulation of a key input (e.g., the key input 220 of FIG. 2) of the user.

In step 850, the electronic device 110 may perform control according to the key base signal. The control may be performed in such a manner as to output the direction control signal to move the focus indicating the selection item by a unit operation in any one of the upward, downward, left, and right directions. In an embodiment, if the pressing of the up key (e.g., 221 of FIG. 2) is detected, the electronic device 110 may control to move the focus by the unit operation in the upward direction from the current selection item. In an embodiment, if the pressing of the down key (e.g., 223 of FIG. 2) is detected, the electronic device 110 may control to move the focus by the unit operation in the downward direction from the current selection item. In an embodiment, if the pressing of the left key (e.g., 225 of FIG. 2) is detected, the electronic device 110 may control to move the focus by the unit operation in the downward direction from the current selection item. According to an embodiment, if the pressing of the right key (e.g., 227 of FIG. 2) is detected, the electronic device 110 may control to move the focus by the unit operation in the downward direction from the current selection item.

Figure 9:
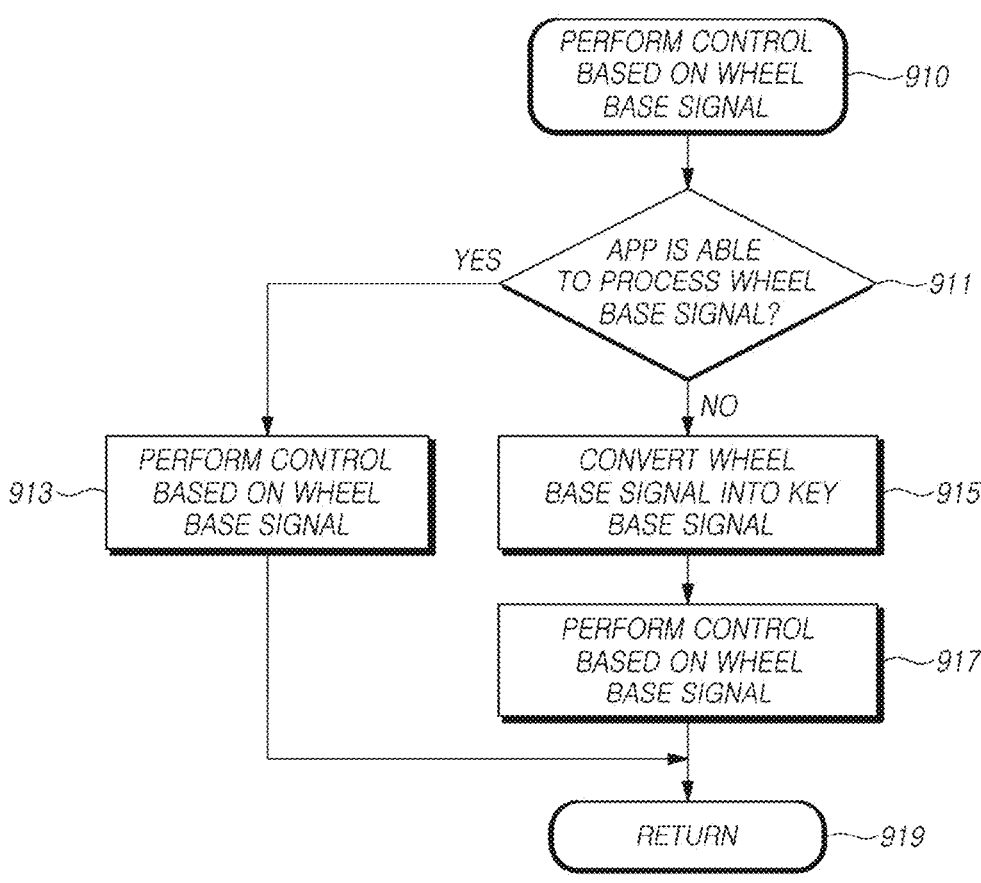
FIG. 9 is a flowchart illustrating example operations of a sub routine performed in an electronic device according to various embodiments.

FIG. 9 is a flowchart illustrating example operations of a sub routine (e.g., the step 820 of FIG. 8) performed in an electronic device (e.g., the electronic device 110 of FIG. 1) according to various embodiments.

Referring to FIG. 9, in operation 910, the electronic device 110 may start a sub routine according to obtaining a wheel base signal. If a sub routine according to obtaining the wheel base signal is started, in step 911, the electronic device 110 may determine whether an application (e.g., the application 730 of FIG. 7) is capable of processing the wheel base signal.

If the application 730 is capable of processing the wheel base signal, in step 913, the electronic device 110 may perform direction control according to the wheel base signal. For example, an application 730 such as a web browser capable of processing a wheel base signal may control to move the page by a unit operation in the upward direction in response to a first wheel base signal generated as the user (e.g., the user 230 of FIG. 2) rotates the wheel (e.g., the wheel input 210 of FIG. 2) in the counterclockwise direction or to move the page by a unit operation in the downward direction in response to a second wheel base signal generated as the user 230 rotates the wheel input 210 in the clockwise direction. The operation of performing step 913 may be described with reference to FIGS. 11A and 11B.

According to an embodiment, if it is determined that the application 730 is unable to process the wheel base signal, in step 915, the electronic device 110 may convert the wheel base signal into a key base signal. According to an embodiment, the electronic device 110 may provide a database in which a corresponding key base signal is set for each wheel base signal that may be generated by manipulation of the wheel input 210. In this case, if the electronic device 110 receives the wheel base signal, the electronic device 110 may obtain the key base signal set in the database corresponding to the received wheel base signal.

In step 917, the electronic device 110 may perform control for the corresponding operation based on the converted key base signal. The electronic device 110 may perform, e.g., control to move the focus indicating the selection item in response to the key base signal. The direction control signal, which is one example of the key base signal, may determine a layout configuration of the application 730 or a configuration of a component provided by a UI framework (e.g., the framework 731 of FIG. 7) of the application to determine a plurality of target object arrangement directions. The target object arrangement direction may include a horizontal direction or a vertical direction. In an embodiment, if the plurality of target objects are arranged in the vertical direction, the first wheel base signal may be output as a first direction control signal for moving the focus by a unit operation in the upward direction, or the second wheel base signal may be output as a second direction control signal for moving the focus by a unit operation in the downward direction. In an embodiment, if the plurality of target objects are arranged in the horizontal direction, the first wheel base signal may be output as a third direction control signal for moving the focus by a unit operation in the left direction, or the second wheel base signal may be output as a fourth direction control signal for moving the focus by a unit operation in the right direction. The operations of performing steps 915 to 917 may be described in detail with reference to FIG. 10. The operation of displaying steps 915 to 917 on the electronic device 110 in terms of a user interface may be described with reference to FIGS. 12 and 13.

In step 919, the operation of returning to the main routine of FIG. 8 may be performed.

Figure 10:
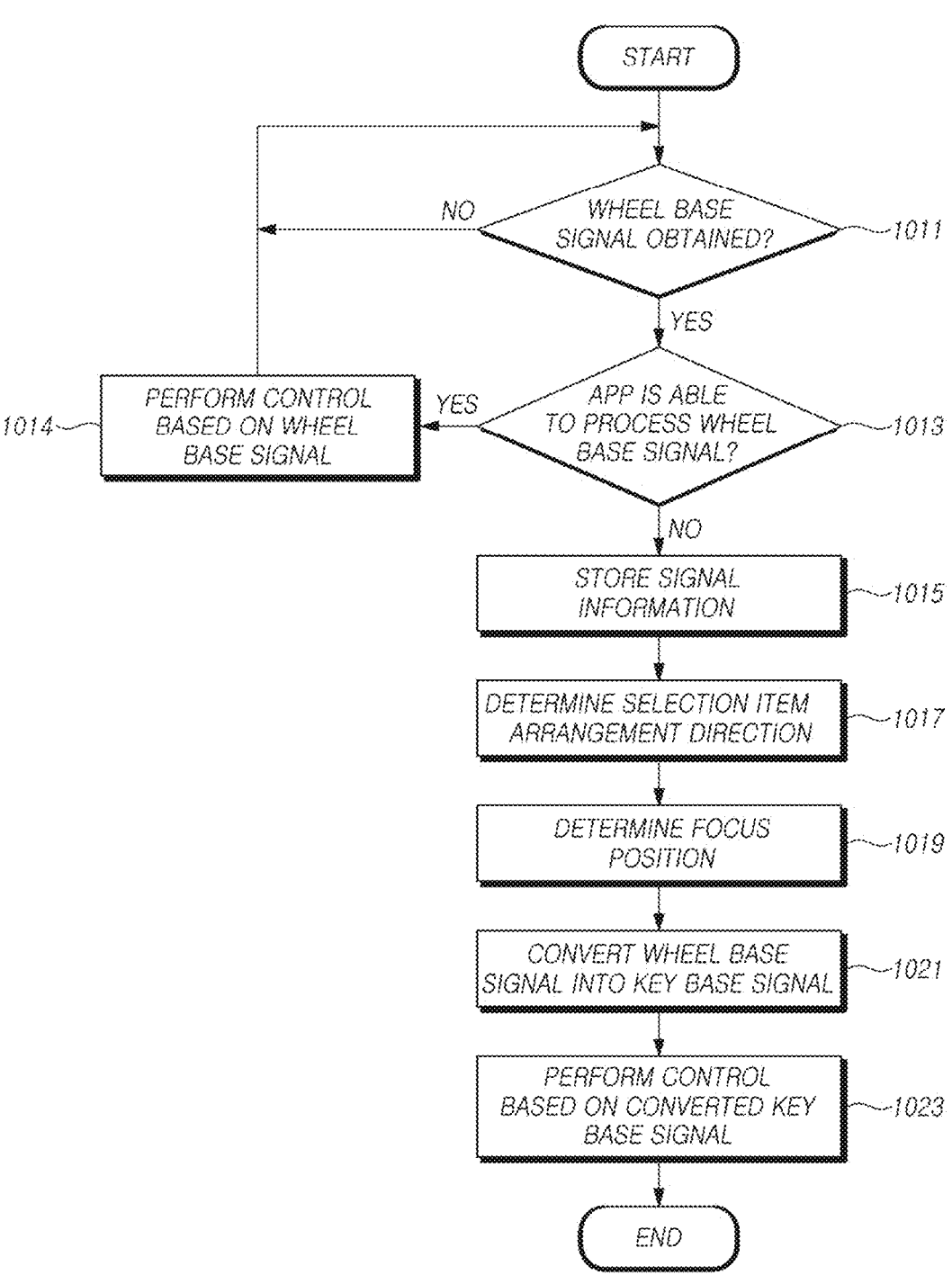
FIG. 10 is a flowchart illustrating example operations performed in response to a wheel base signal in an electronic device according to various embodiments.

FIG. 10 is a flowchart illustrating example operations performed in response to a wheel base signal in an electronic device (e.g., the electronic device 110 of FIG. 1) according to various embodiments.

Referring to FIG. 10, in an embodiment, step 1011 may perform the same or similar operation as step 810 of FIG. 8, step 1013 may perform the same or similar operation as step 911 of FIG. 9, and step 1014 may perform the same or similar operation as step 913 of FIG. 9, and thus a description thereof may not be repeated here. The following is a flowchart including more detailed operations in performing steps 915 to 917 of FIG. 9.

Referring to FIG. 10, in step 1011, the electronic device 110 may determine whether a wheel base signal is obtained. If it is determined that the wheel base signal is obtained, in step 1013, the electronic device 110 may determine whether an application (e.g., the application 730 of FIG. 7) is capable of processing the wheel base signal.

If the application 730 is capable of processing the wheel base signal, in step 1014, the electronic device 110 may perform direction control according to the wheel base signal. For example, an application 730 such as a web browser capable of processing a wheel base signal may control to move the page by a unit operation in the upward direction in response to a first wheel base signal generated as the user (e.g., the user 230 of FIG. 2) rotates the wheel (e.g., the wheel input 210 of FIG. 2) in the counterclockwise direction or to move the page by a unit operation in the downward direction in response to a second wheel base signal generated as the user 230 rotates the wheel input 210 in the clockwise direction. The operation of performing step 1014 may be described in greater detail below with reference to FIGS. 11A and 11B.

If the application 730 is unable to process the wheel base signal, in step 1015, the electronic device 110 may store information about the wheel base signal. The information about the wheel base signal may be defined as first signal information. The first signal information may be stored in a memory (e.g., the memory 640 of FIG. 6) of the electronic device 110. The first signal information may include direction information (e.g., counterclockwise rotation or clockwise rotation) of the wheel base signal or information indicating that the first signal is an electrical signal generated by manipulation of the wheel input (e.g., the wheel input 210 of FIG. 2) of the user.

In step 1017, the electronic device 110 may determine an arrangement direction of a plurality of selection items disposed in the application 730. The arrangement direction may be, e.g., one of a vertical arrangement or a horizontal arrangement.

In step 1019, the electronic device 110 may determine the position of the focus indicating any one of the plurality of selection items. The position may include, e.g., whether it is an end in a progressing direction.

In step 1021, the electronic device 110 may convert the wheel base signal into a key base signal. In an embodiment, the electronic device 110 may convert the wheel base signal into the key base signal based on the arrangement direction of the plurality of selection items and the position of the focus. In an embodiment, if the first wheel base signal in the counterclockwise direction is obtained and it is determined that the plurality of selection items are arranged in the vertical direction and the position of the focus is not the end, the electronic device 110 may convert the first wheel base signal into the first direction control signal for moving the focus by the unit operation in the upward direction. In an embodiment, if the second wheel base signal in the clockwise direction is obtained and it is determined that the plurality of selection items are arranged in the vertical direction and the position of the focus is not the end, the electronic device 110 may convert the second wheel base signal into the second direction control signal for moving the focus by the unit operation in the downward direction. In an embodiment, if the first wheel base signal in the counterclockwise direction is obtained and it is determined that the plurality of selection items are arranged in the horizontal direction and the position of the focus is not the end, the electronic device 110 may convert the first wheel base signal into the third direction control signal for moving the focus by the unit operation in the left direction. In an embodiment, if the second wheel base signal in the clockwise direction is obtained and it is determined that the plurality of selection items are arranged in the horizontal direction and the position of the focus is not the end, the electronic device 110 may convert the second wheel base signal into the fourth direction control signal for moving the focus by the unit operation in the right direction. In an embodiment, if the first wheel base signal in the counterclockwise direction is obtained and it is determined that the plurality of selection items are arranged in the vertical direction and the position of the focus is the upper end, the electronic device 110 may convert the first wheel base signal into the fifth direction control signal for moving the focus by the unit operation to the lower end of the left row. In an embodiment, if the second wheel base signal in the clockwise direction is obtained and it is determined that the plurality of selection items are arranged in the vertical direction and the position of the focus is the lower end, the electronic device 110 may convert the second wheel base signal into the sixth direction control signal for moving the focus by the unit operation to the upper end of the right row. In an embodiment, if the first wheel base signal in the counterclockwise direction is obtained and it is determined that the plurality of selection items are arranged in the horizontal direction and the position of the focus is the left end, the electronic device 110 may convert the first wheel base signal into the seventh direction control signal for moving the focus by the unit operation to the right end of the upper row. In an embodiment, if the second wheel base signal in the clockwise direction is obtained and it is determined that the plurality of selection items are arranged in the horizontal direction and the position of the focus is the lower end, the electronic device 110 may convert the second wheel base signal into the eighth direction control signal for moving the focus by the unit operation to the left end of the lower row.

In step 1023, the electronic device 110 may perform control for the corresponding operation according to the converted key base signal. In an embodiment, the electronic device 110 may perform control for moving the focus indicating the selection item in response to the converted direction control signal.

Figure 11A:
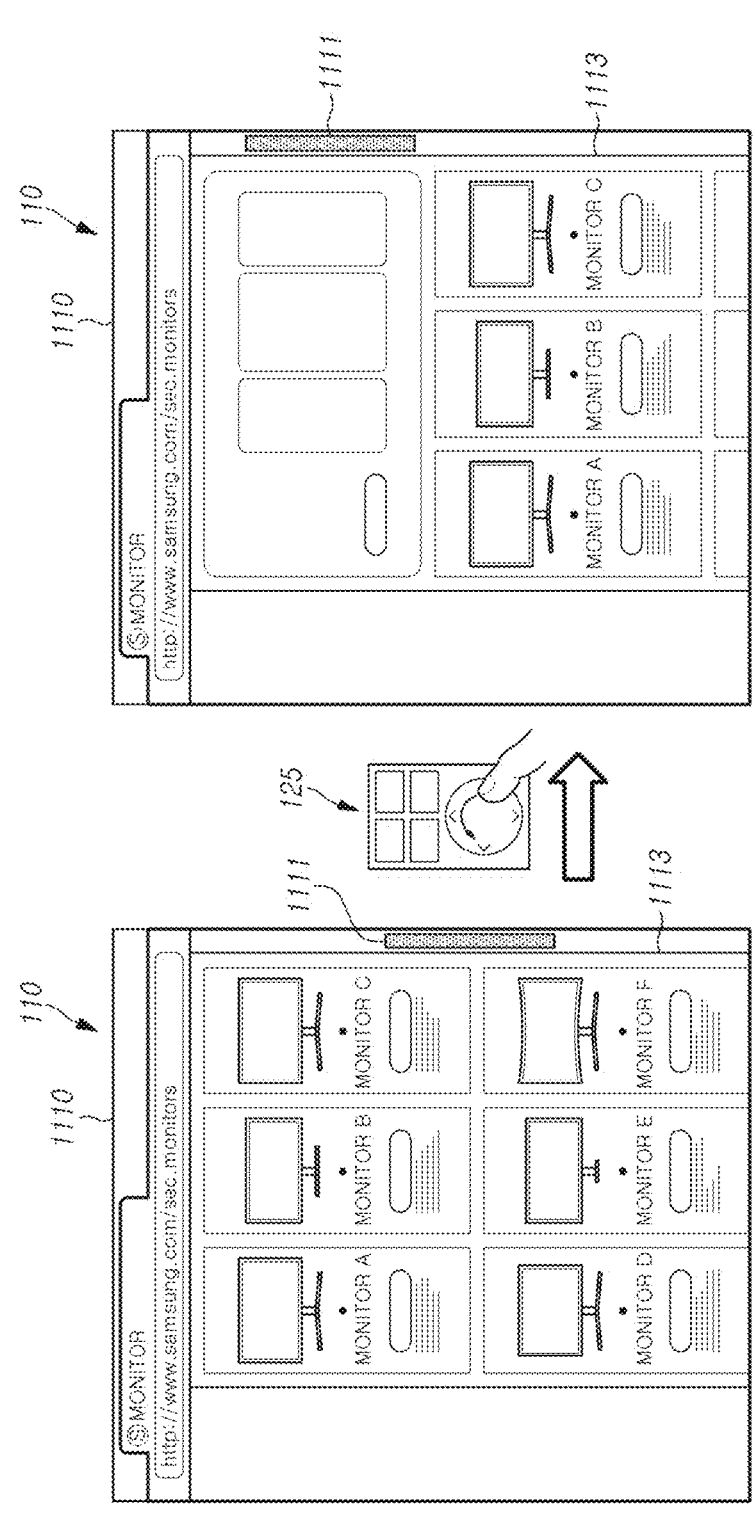
FIGS. 11A and 11B are diagrams illustrating an example of driving by a wheel base signal in an electronic device according to various embodiments.

FIG. 11A is a diagram illustrating an example of driving by a wheel base signal in an electronic device (e.g., the electronic device 110 of FIG. 1) according to various embodiments.

FIG. 11A illustrates an example of a change in the user interface screen 1110 when an event occurs in which the user (e.g., the user 230 of FIG. 2) rotates the wheel input 210 provided in the wheel input device 125 in the counterclockwise direction in the electronic device 110 in which an application (e.g., the application 730 of FIG. 7) capable of processing a wheel base signal, such as a web browser, is executed.

Referring to FIG. 11A, in an embodiment, if the application 730 is executed at the request of the user (e.g., the user 230 of FIG. 2), the electronic device 110 may display a screen according to the execution of the application 730. The application 730 may be, e.g., an application corresponding to a web browser capable of processing a wheel base signal. The view illustrated on the left side of FIG. 11A may be an example of the user interface screen 1110 displayed on a display (e.g., the display 630 of FIG. 6) by executing the application 730. In an embodiment, the user interface screen 1110 may include a plurality of selection items 1113 selectable by the user 230 and a scroll bar 1111 capable of moving the plurality of selection items 1113 or indicating the points where the plurality of selection items 1113 are positioned in the entire list.

According to an embodiment, if an event in which the user 230 manipulates the wheel input device 125 occurs, the wheel input device 125 may provide a wheel base signal corresponding to the generated event to the electronic device 110. The event caused by the user 230 manipulating the wheel input device 125 may be discerned by, e.g., the rotation (e.g., 234 of FIG. 2) direction of the wheel input (e.g., the wheel input 210 of FIG. 2).

In an embodiment, as illustrated, when the user 230 rotates the wheel input 210 provided in the wheel input device 125 in the counterclockwise direction, the wheel input device 125 may provide the first wheel base signal to the electronic device 110. The first wheel base signal may include direction identification information indicating that the rotation direction is the counterclockwise direction and rotation amount information (e.g., information about the rotation angle) indicating the rotation degree.

According to an embodiment, the electronic device 110 may receive the first wheel base signal, may identify that the wheel input 210 has rotated in the counterclockwise direction based on the direction identification information included in the received first wheel base signal, and may identify how much rotation has been performed based on the rotation amount information indicating the rotation information included in the received first wheel base signal. In this case, the electronic device 110 may move the scroll bar 1111 included in the user interface screen 1110 by the distance corresponding to the amount of rotation identified, in the upward direction, which is the direction corresponding to the counterclockwise rotation. When the scroll bar 1111 moves, the electronic device 110 may display, on the user interface screen 1110, selection items 1113 newly selected from the entire list in proportion to the direction and distance in which the scroll bar 1111 moves (see the view shown on the right side of FIG. 11A). According to an embodiment, the user interface screen 1110 illustrated on the right side of FIG. 11A may be one according to the result of performing the operation in step 913 of FIG. 9.

Figure 11B:
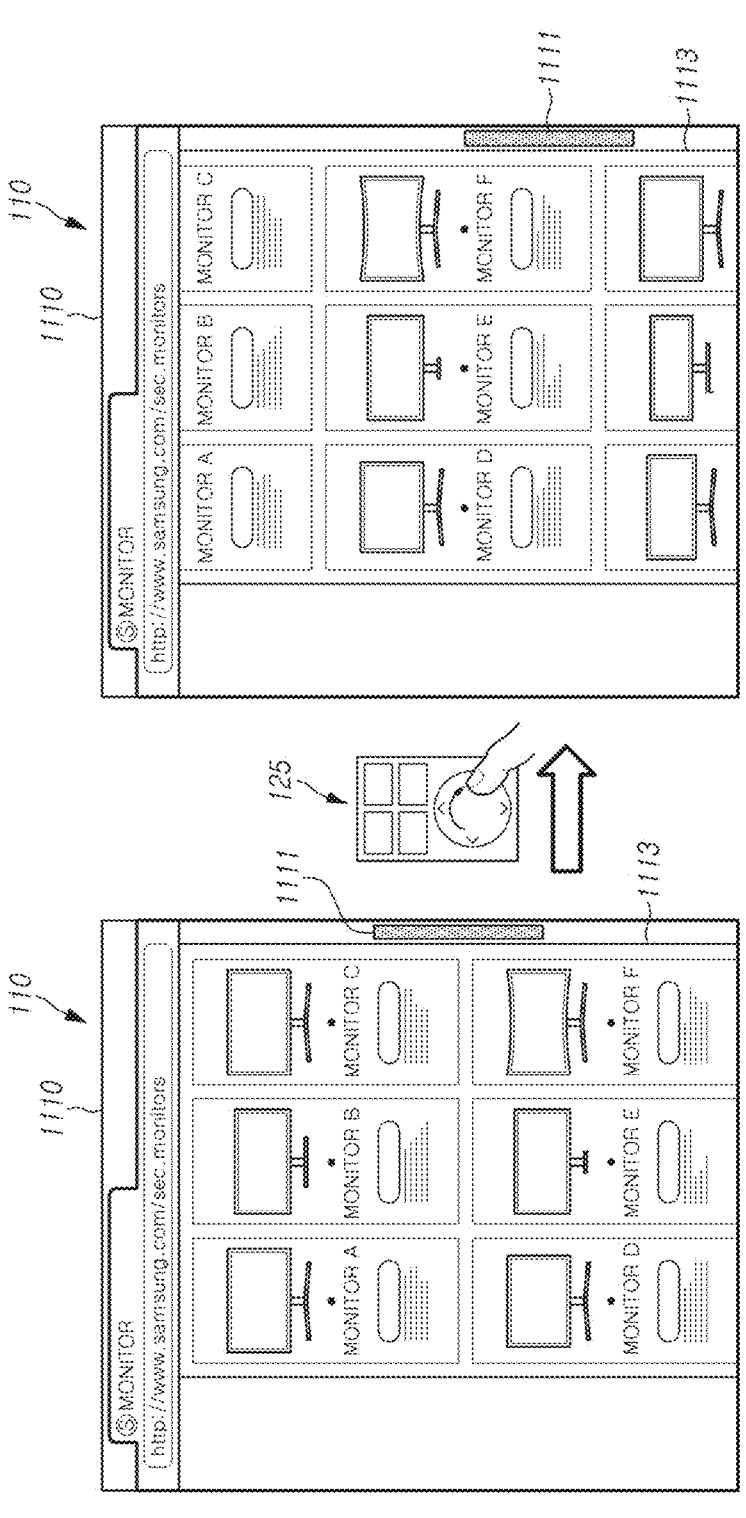

FIG. 11B is a diagram illustrating an example of driving by a wheel base signal in an electronic device (e.g., the electronic device 110 of FIG. 1) according to various embodiments.

FIG. 11B illustrates an example of a change in the user interface screen 1110 when an event occurs in which the user (e.g., the user 230 of FIG. 2) rotates the wheel input 210 provided in the wheel input device 125 clockwise in the electronic device 110 in which an application (e.g., the application 730 of FIG. 7) capable of processing a wheel base signal, such as a web browser, is executed.

Referring to FIG. 11B, in an embodiment, if the application 730 is executed at the request of the user 230, the electronic device 110 may display a screen according to the execution of the application 730. The application 730 may be, e.g., an application corresponding to a web browser capable of processing a wheel base signal. The view illustrated on the left side of FIG. 11B may be an example of the user interface screen 1110 displayed on the display 630 by executing the application 730. In an embodiment, the user interface screen 1110 may include a plurality of selection items 1113 selectable by the user 230 and a scroll bar 1111 capable of moving the plurality of selection items 1113 or indicating the points where the plurality of selection items 1113 are positioned in the entire list.

According to an embodiment, if an event in which the user 230 manipulates the wheel input device 125 occurs, the wheel input device 125 may provide a wheel base signal corresponding to the generated event to the electronic device 110. The event caused by the user 230 manipulating the wheel input device 125 may be discerned by, e.g., the rotation direction of the wheel input 210.

In an embodiment, as illustrated, when the user 230 rotates the wheel input 210 provided in the wheel input device 125 in the clockwise direction, the wheel input device 125 may provide the second wheel base signal to the electronic device 110. The second wheel base signal may include direction identification information indicating that the rotation direction is the clockwise direction and rotation amount information (e.g., information about the rotation angle) indicating the rotation degree.

According to an embodiment, the electronic device 110 may receive the second wheel base signal, may identify that the wheel input 210 has rotated in the clockwise direction based on the direction identification information included in the received second wheel base signal, and may identify how much rotation has been performed based on the rotation amount information indicating the rotation information included in the received second wheel base signal. In this case, the electronic device 110 may move the scroll bar 1111 included in the user interface screen 1110 by the distance corresponding to the amount of rotation identified, in the downward direction, which is the direction corresponding to the clockwise rotation. When the scroll bar 1111 moves, the electronic device 110 may display, on the user interface screen 1110, selection items 1113 newly selected from the entire list in proportion to the direction and distance in which the scroll bar 1111 moves (see the view shown on the right side of FIG. 11B). According to an embodiment, the user interface screen 1110 illustrated on the right side of FIG. 11B may be one according to the result of performing the operation in step 913 of FIG. 9.

Figure 12:
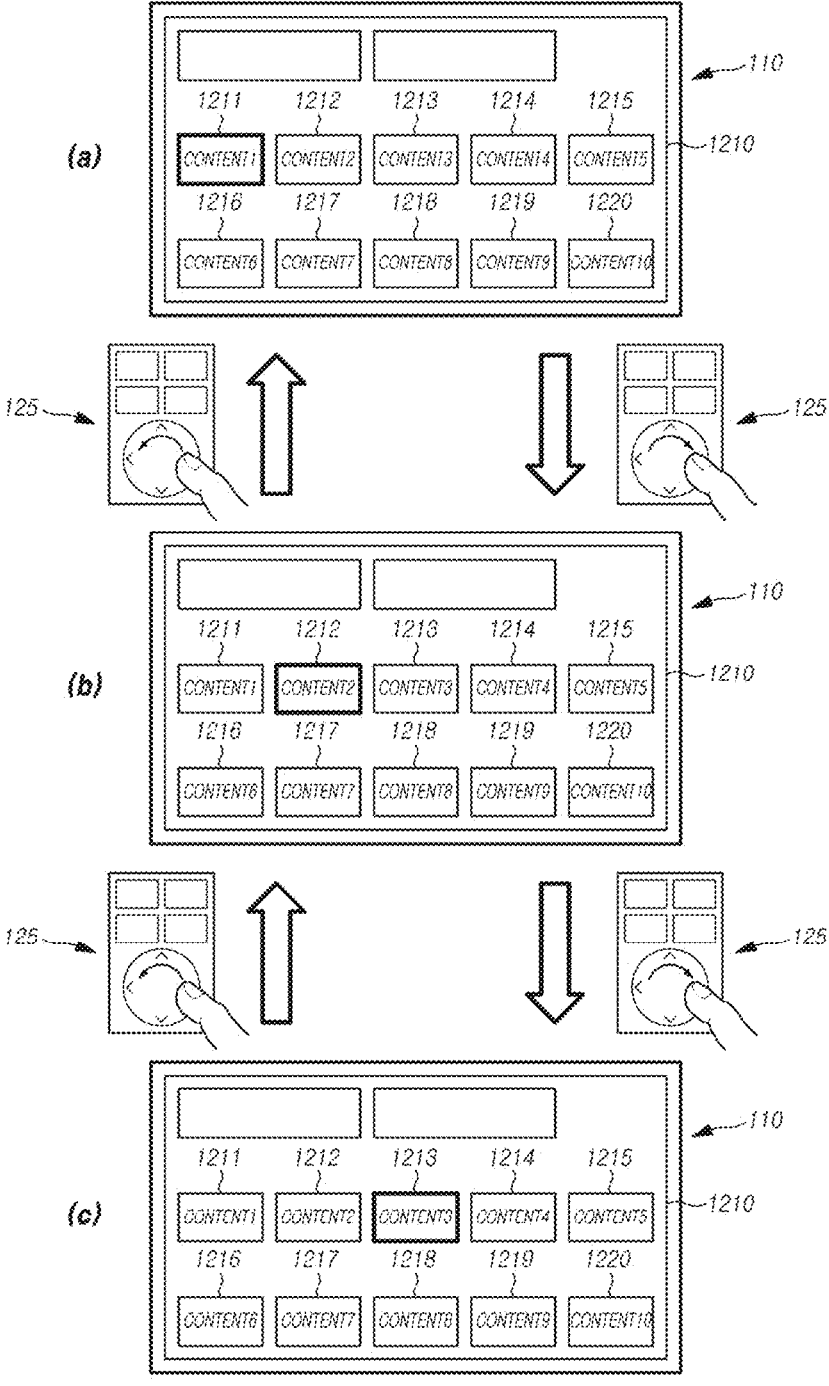
FIG. 12 is a diagram illustrating an example of driving by a wheel base signal in an electronic device according to various embodiments.

FIG. 12 is a diagram illustrating an example of driving by a wheel base signal in an electronic device (e.g., the electronic device 110 of FIG. 1) according to various embodiments.

FIG. 12 illustrates an example of a change in the user interface screen 1210 when an event occurs in which the user (e.g., the user 230 of FIG. 2) rotates the wheel input 210 provided in the wheel input device 125 in the counterclockwise or clockwise direction in the electronic device 110 in which an application (e.g., the application 730 of FIG. 7) incapable of processing a wheel base signal is executed.

Here, the user interface screen 1210 assumes that the focus for selecting one selection item from among the plurality of selection items is moved in the horizontal direction (left and right direction).

Referring to FIG. 12, in an embodiment, if the application 730 is executed at the request of the user 230, the electronic device 110 may display a screen according to the execution of the application 730. The application 730 may be, e.g., an application incapable of processing a wheel base signal.

An example of the user interface screen 1210 displayed on the display (e.g., the display 630 of FIG. 6) by executing the application 730 may be one of (a), (b), or (c). The user interface screen 1210 may include a plurality of selection items 1211, 1212, 1213, 1214, 1215, 1216, 1217, 1218, 1219, and 1220 that may be selected by the user 230.

If an event in which the user 230 manipulates the wheel input device 125 occurs, the wheel input device 125 may provide a wheel base signal corresponding to the occurring event to the electronic device 110. The event caused by the user 230 manipulating the wheel input device 125 may be discerned by, e.g., the rotation (e.g., 234 of FIG. 2) direction of the wheel input (e.g., the wheel input 210 of FIG. 2).

According to an embodiment, as illustrated, when the user 230 rotates the wheel input 210 provided in the wheel input device 125 in the counterclockwise direction, the wheel input device 125 may provide the first wheel base signal to the electronic device 110. The first wheel base signal may include direction identification information indicating that the rotation direction is the counterclockwise direction and rotation amount information (e.g., information about the rotation angle) indicating the rotation degree.

The electronic device 110 may receive the first wheel base signal, may identify that the wheel input 210 has rotated in the counterclockwise direction based on the direction identification information included in the received first wheel base signal, and may identify how much rotation has been performed based on the rotation amount information indicating the rotation information included in the received first wheel base signal. According to an embodiment, the electronic device 110 may generate a key base signal considering the identified rotation direction and the identified rotation amount. In an embodiment, the electronic device 110 may determine the direction of the key base signal as the left direction considering that the identified rotation direction is the counterclockwise direction. In an embodiment, the electronic device 110 may determine the moving distance by which the focus is to be moved to the left by the key base signal considering the identified rotation amount. The moving distance may correspond to, e.g., the number of times the left key provided in the remote control (e.g., the remote control 121 of FIG. 1) is pressed. In the following description, for convenience, it will be assumed that the identified rotation amount is the degree to which the left key provided in the remote control 121 is pressed once. However, when the identified rotation amount is larger than or equal to it, the electronic device 110 may obtain the number of times the left key is pressed in the remote control 121 in proportion to the identified rotation amount, and may move the focus to the left by the obtained number of times of pressing.

In an embodiment, if it is identified that the rotation direction is the counterclockwise direction in a circumstance of the user interface screen 1210 (screen (c)) of the focus selecting the content 3 1213, the electronic device 110 may display the user interface screen 1210 (screen (b)) in which the focus is moved in the left direction so that the content 2 1212 disposed on the left side of the content 3 1213 is selected.

In an embodiment, if it is identified that the rotation direction is the counterclockwise direction in a circumstance of the user interface screen 1210 (screen (b)) of the focus selecting the content 2 1212, the electronic device 110 may display the user interface screen 1210 (screen (a)) in which the focus is moved in the left direction so that the content 1 1211 disposed on the left side of the content 2 1212 is selected.

According to an embodiment, as illustrated, when the user 230 rotates the wheel input 210 provided in the wheel input device 125 in the clockwise direction, the wheel input device 125 may provide the second wheel base signal to the electronic device 110. The second wheel base signal may include direction identification information indicating that the rotation direction is the clockwise direction and rotation amount information (e.g., information about the rotation angle) indicating the rotation degree.

The electronic device 110 may receive the second wheel base signal, may identify that the wheel input 210 has rotated in the clockwise direction based on the direction identification information included in the received second wheel base signal, and may identify how much rotation has been performed based on the rotation amount information indicating the rotation information included in the received second wheel base signal. According to an embodiment, the electronic device 110 may generate a key base signal considering the identified rotation direction and the identified rotation amount. In an embodiment, the electronic device 110 may determine the direction of the key base signal as the right direction considering that the identified rotation direction is the clockwise direction. In an embodiment, the electronic device 110 may determine the moving distance by which the focus is to be moved to the right by the key base signal considering the identified rotation amount. The moving distance may correspond to, e.g., the number of times the right key provided in the remote control (e.g., the remote control 121 of FIG. 1) is pressed. In the following description, for convenience, it will be assumed that the identified rotation amount is the degree to which the right key provided in the remote control 121 is pressed once. However, when the identified rotation amount is larger than or equal to it, the electronic device 110 may obtain the number of times the right key is pressed in the remote control 121 in proportion to the identified rotation amount, and may move the focus to the right by the obtained number of times of pressing.

In an embodiment, if it is identified that the rotation direction is the clockwise direction in a circumstance of the user interface screen 1210 (screen (a)) of the focus selecting the content 1 1211, the electronic device 110 may display the user interface screen 1210 (screen (b)) in which the focus is moved in the right direction so that the content 2 1212 disposed on the right side of the content 2 1211 is selected.

In an embodiment, if it is identified that the rotation direction is the clockwise direction in a circumstance of the user interface screen 1210 (screen (b)) of the focus selecting the content 2 1212, the electronic device 110 may display the user interface screen 1210 (screen (c)) in which the focus is moved in the right direction so that the content 3 1213 disposed on the right side of the content 2 1212 is selected.

The examples (screen a, screen b, and screen c) of the user interface screen 1210 described above may be ones according to the result of performing the operations in steps 915 to 197 of FIG. 9.

Figure 13:
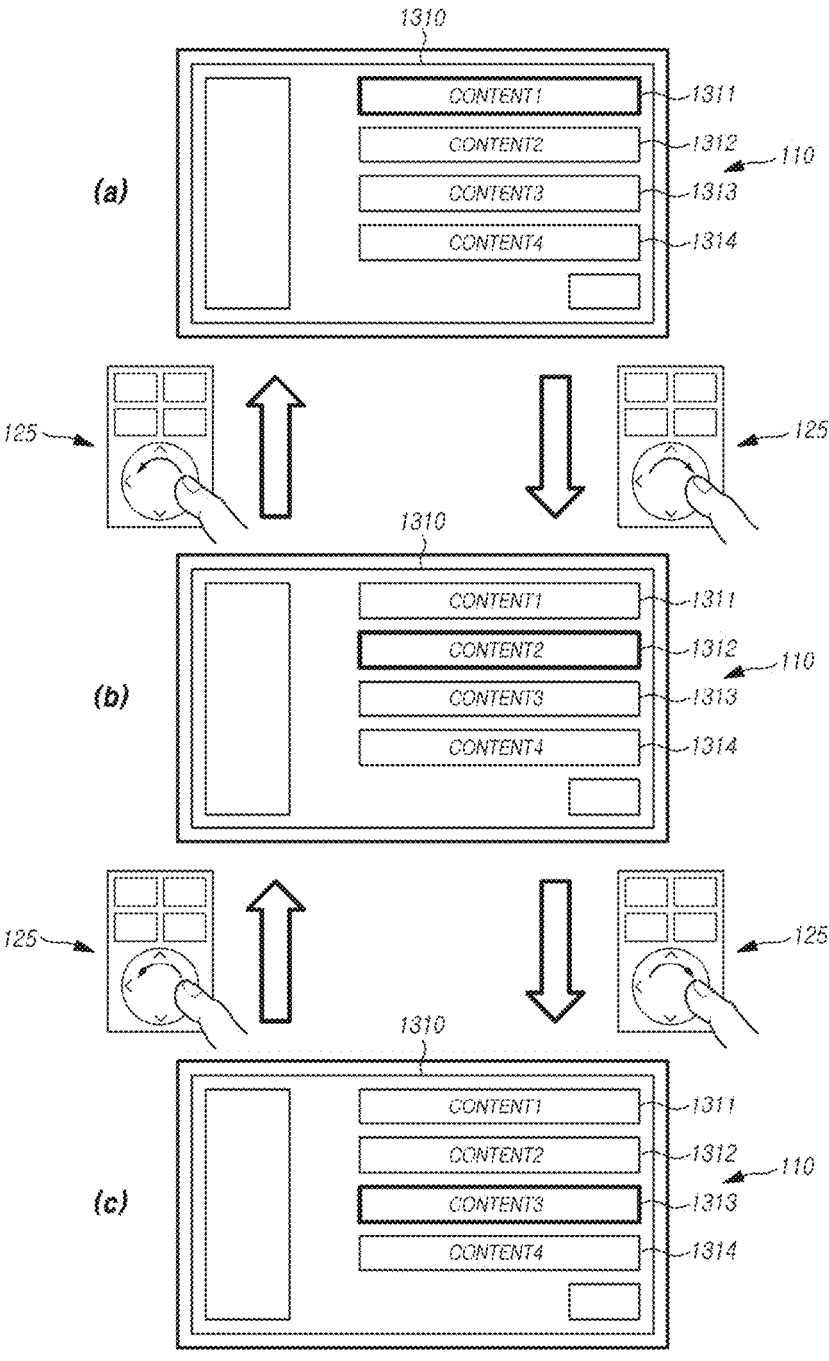
FIG. 13 is a diagram illustrating an example of driving by a wheel base signal in an electronic device according to various embodiments.

FIG. 13 is a diagram illustrating an example of driving by a wheel base signal in an electronic device (e.g., the electronic device 110 of FIG. 1) according to various embodiments.

FIG. 13 illustrates an example of a change in the user interface screen 1310 when an event occurs in which the user (e.g., the user 230 of FIG. 2) rotates the wheel input 210 provided in the wheel input device 125 in the counterclockwise or clockwise direction in the electronic device 110 in which an application (e.g., the application 730 of FIG. 7) incapable of processing a wheel base signal is executed. Here, the user interface screen 1310 assumes that the focus for selecting one selection item from among the plurality of selection items is moved in the vertical direction (upward/downward direction).

Referring to FIG. 13, in an embodiment, if the application 730 is executed at the request of the user 230, the electronic device 110 may display a screen according to the execution of the application 730. The application 730 may be, e.g., an application incapable of processing a wheel base signal.

An example of the user interface screen 1310 displayed on the display (e.g., the display 630 of FIG. 6) by executing the application 730 may be one of (a), (b), or (c). The user interface screen 1310 may include a plurality of selection items 1311, 1312, 1313, and 1314 that may be selected by the user 230.

If an event in which the user 230 manipulates the wheel input device 125 occurs, the wheel input device 125 may provide a wheel base signal corresponding to the occurring event to the electronic device 110. The event caused by the user 230 manipulating the wheel input device 125 may be discerned by, e.g., the rotation (e.g., 234 of FIG. 2) direction of the wheel input (e.g., the wheel input 210 of FIG. 2).

According to an embodiment, as illustrated, when the user 230 rotates the wheel input 210 provided in the wheel input device 125 in the counterclockwise direction, the wheel input device 125 may provide the first wheel base signal to the electronic device 110. The first wheel base signal may include direction identification information indicating that the rotation direction is the counterclockwise direction and rotation amount information (e.g., information about the rotation angle) indicating the rotation degree.

The electronic device 110 may receive the first wheel base signal, may identify that the wheel input 210 has rotated in the counterclockwise direction based on the direction identification information included in the received first wheel base signal, and may identify how much rotation has been performed based on the rotation amount information indicating the rotation information included in the received first wheel base signal. According to an embodiment, the electronic device 110 may generate a key base signal considering the identified rotation direction and the identified rotation amount. In an embodiment, the electronic device 110 may determine the direction of the key base signal as the upward direction considering that the identified rotation direction is the counterclockwise direction. In an embodiment, the electronic device 110 may determine the moving distance by which the focus is to be moved upward by the key base signal considering the identified rotation amount. The moving distance may correspond to, e.g., the number of times the up key provided in the remote control (e.g., the remote control 121 of FIG. 1) is pressed. In the following description, for convenience, it will be assumed that the identified rotation amount is the degree to which the up key provided in the remote control 121 is pressed once. However, when the identified rotation amount is larger than or equal to it, the electronic device 110 may obtain the number of times the up key is pressed in the remote control 121 in proportion to the identified rotation amount, and may move the focus upward by the obtained number of times of pressing.

In an embodiment, if it is identified that the rotation direction is the counterclockwise direction in a circumstance of the user interface screen 1310 (screen (c)) of the focus selecting the content 3 1313, the electronic device 110 may display the user interface screen 1310 (screen (b)) in which the focus is moved in the upward direction so that the content 2 1312 disposed on the upper side of the content 3 1313 is selected.

In an embodiment, if it is identified that the rotation direction is the counterclockwise direction in a circumstance of the user interface screen 1310 (screen (b)) of the focus selecting the content 2 1312, the electronic device 110 may display the user interface screen 1310 (screen (a)) in which the focus is moved in the upper direction so that the content 1 1311 disposed on the upper side of the content 2 1312 is selected.

According to an embodiment, as illustrated, when the user 230 rotates the wheel input 210 provided in the wheel input device 125 in the clockwise direction, the wheel input device 125 may provide the second wheel base signal to the electronic device 110. The second wheel base signal may include direction identification information indicating that the rotation direction is the clockwise direction and rotation amount information (e.g., information about the rotation angle) indicating the rotation degree.

The electronic device 110 may receive the second wheel base signal, may identify that the wheel input 210 has rotated in the clockwise direction based on the direction identification information included in the received second wheel base signal, and may identify how much rotation has been performed based on the rotation amount information indicating the rotation information included in the received second wheel base signal. According to an embodiment, the electronic device 110 may generate a key base signal considering the identified rotation direction and the identified rotation amount. In an embodiment, the electronic device 110 may determine the direction of the key base signal as the downward direction considering that the identified rotation direction is the clockwise direction. In an embodiment, the electronic device 110 may determine the moving distance by which the focus is to be moved downward by the key base signal considering the identified rotation amount. The moving distance may correspond to, e.g., the number of times the down key provided in the remote control (e.g., the remote control 121 of FIG. 1) is pressed. In the following description, for convenience, it will be assumed that the identified rotation amount is the degree to which the down key provided in the remote control 121 is pressed once. However, when the identified rotation amount is larger than or equal to it, the electronic device 110 may obtain the number of times the down key is pressed in the remote control 121 in proportion to the identified rotation amount, and may move the focus downward by the obtained number of times of pressing.

In an embodiment, if it is identified that the rotation direction is the clockwise direction in a circumstance of the user interface screen 1310 (screen (a)) of the focus selecting the content 1 1311, the electronic device 110 may display the user interface screen 1310 (screen (b)) in which the focus is moved in the downward direction so that the content 2 1312 disposed on the lower side of the content 2 1311 is selected.

In an embodiment, if it is identified that the rotation direction is the clockwise direction in a circumstance of the user interface screen 1310 (screen (b)) of the focus selecting the content 2 1312, the electronic device 110 may display the user interface screen 1310 (screen (c)) in which the focus is moved in the downward direction so that the content 3 1313 disposed on the lower side of the content 2 1212 is selected.

The examples (screen a, screen b, and screen c) of the user interface screen 3210 described above may be ones according to the result of performing the operations in steps 915 to 197 of FIG. 9.

Figure 14:
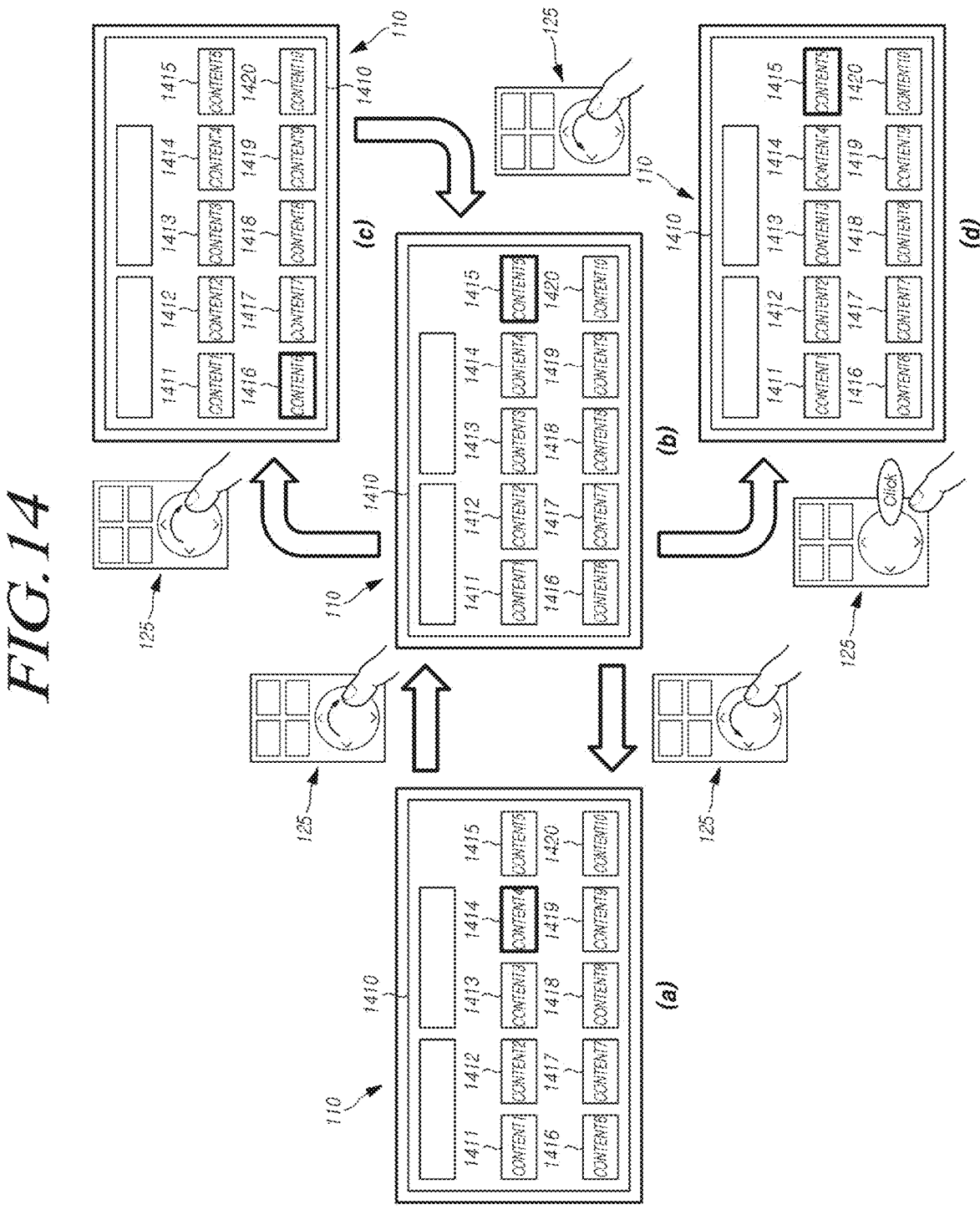
FIG. 14 is a diagram illustrating an example of driving by a wheel base signal or a key base signal in an electronic device according to various embodiments.

FIG. 14 is a diagram illustrating an example of driving by a wheel base signal or a key base signal in an electronic device (e.g., the electronic device 110 of FIG. 1) according to various embodiments.

FIG. 14 illustrates an example of a change in the user interface screen 1410 when an event occurs in which the user (e.g., the user 230 of FIG. 2) rotates the wheel input 210 provided in the wheel input device 125 in the counterclockwise or clockwise direction in the electronic device 110 in which an application (e.g., the application 730 of FIG. 7) incapable of processing a wheel base signal is executed. Here, the user interface screen 1410 considers that the focus of selecting one selection item among the plurality of selection items moves in the horizontal direction (left/right direction), and a movement at a position (a circumstance where the selection item disposed at the left end is selected) where the focus is not movable to the left any more and a movement at a position (a circumstance where the selection item disposed at the right end is selected) where the focus is not movable to the right any more.

Referring to FIG. 14, an example of the user interface screen 1410 displayed on the display (e.g., the display 630 of FIG. 6) by executing the application 730 may be one of (a), (b), (c), or (d). The user interface screen 1410 may include a plurality of selection items 1411, 1412, 1413, 1414, 1415, 1416, 1417, 1418, 1419, and 1420 that may be selected by the user 230. If an event in which the user 230 manipulates the wheel input device 125 occurs, the wheel input device 125 may provide a wheel base signal corresponding to the occurring event to the electronic device 110. The event caused by the user 230 manipulating the wheel input device 125 may be discerned by, e.g., the rotation (e.g., 234 of FIG. 2) direction of the wheel input (e.g., the wheel input 210 of FIG. 2).

According to an embodiment, as illustrated, when the user 230 rotates the wheel input 210 provided in the wheel input device 125 in the counterclockwise direction, the wheel input device 125 may provide the first wheel base signal to the electronic device 110. The first wheel base signal may include direction identification information indicating that the rotation direction is the counterclockwise direction and rotation amount information (e.g., information about the rotation angle) indicating the rotation degree.

The electronic device 110 may receive the first wheel base signal, may identify that the wheel input 210 has rotated in the counterclockwise direction based on the direction identification information included in the received first wheel base signal, and may identify how much rotation has been performed based on the rotation amount information indicating the rotation information included in the received first wheel base signal. According to an embodiment, the electronic device 110 may generate a key base signal considering the identified rotation direction and the identified rotation amount. In an embodiment, the electronic device 110 may determine the direction of the key base signal as the left direction considering that the identified rotation direction is the counterclockwise direction. In an embodiment, the electronic device 110 may determine the moving distance by which the focus is to be moved to the left by the key base signal considering the identified rotation amount. The moving distance may correspond to, e.g., the number of times the left key provided in the remote control (e.g., the remote control 121 of FIG. 1) is pressed. In the following description, for convenience, it will be assumed that the identified rotation amount is the degree to which the left key provided in the remote control 121 is pressed once. However, when the identified rotation amount is larger than or equal to it, the electronic device 110 may obtain the number of times the left key is pressed in the remote control 121 in proportion to the identified rotation amount, and may move the focus to the left by the obtained number of times of pressing.

In an embodiment, if it is identified that the rotation direction is the counterclockwise direction in a circumstance of is the user interface screen 1410 (screen (b)) of the focus selecting the content 5 1415, the electronic device 110 may display the user interface screen 1410 (screen (a)) in which the focus is moved in the left direction so that the content 4 1414 disposed on the left side of the content 5 1415 is selected.

In an embodiment, if it is identified that the rotation direction is the counterclockwise direction in a circumstance of the user interface screen 1410 (screen (c)) of the focus selecting the content 6 1416, the electronic device 110 may perform control to move the focus to the content disposed on the left side of the content 6 1416. However, the electronic device 110 may recognize that the focus is currently at a position where no content is present to the left and accordingly display the user interface screen 1410 (screen (b)) where the focus has been moved to select the content 5 1415 disposed at the right end of the upper row.

According to an embodiment, as illustrated, when the user 230 rotates the wheel input 210 provided in the wheel input device 125 in the clockwise direction, the wheel input device 125 may provide the second wheel base signal to the electronic device 110. The second wheel base signal may include direction identification information indicating that the rotation direction is the clockwise direction and rotation amount information (e.g., information about the rotation angle) indicating the rotation degree.

The electronic device 110 may receive the second wheel base signal, may identify that the wheel input 210 has rotated in the clockwise direction based on the direction identification information included in the received second wheel base signal, and may identify how much rotation has been performed based on the rotation amount information indicating the rotation information included in the received second wheel base signal. According to an embodiment, the electronic device 110 may generate a key base signal considering the identified rotation direction and the identified rotation amount. In an embodiment, the electronic device 110 may determine the direction of the key base signal as the right direction considering that the identified rotation direction is the clockwise direction. In an embodiment, the electronic device 110 may determine the moving distance by which the focus is to be moved to the right by the key base signal considering the identified rotation amount. The moving distance may correspond to, e.g., the number of times the right key provided in the remote control (e.g., the remote control 121 of FIG. 1) is pressed. In the following description, for convenience, it will be assumed that the identified rotation amount is the degree to which the right key provided in the remote control 121 is pressed once. However, when the identified rotation amount is larger than or equal to it, the electronic device 110 may obtain the number of times the right key is pressed in the remote control 121 in proportion to the identified rotation amount, and may move the focus to the right by the obtained number of times of pressing.

In an embodiment, if it is identified that the rotation direction is the clockwise direction in a circumstance of the user interface screen 1410 (screen (a)) of the focus selecting the content 4 1414, the electronic device 110 may display the user interface screen 1410 (screen (b)) in which the focus is moved in the right direction so that the content 5 1415 disposed on the right side of the content 4 1414 is selected.

In an embodiment, if it is identified that the rotation direction is the clockwise direction in a circumstance of the user interface screen 1410 (screen (b)) of the focus selecting the content 5 1415, the electronic device 110 may perform control to move the focus to the content disposed on the right side of the content 5 1415. However, the electronic device 110 may recognize that the focus is currently at a position where no content is present to the right and accordingly display the user interface screen 1410 (screen (c)) where the focus has been moved to select the content 6 1416 disposed at the left end of the lower row.

In an embodiment, if the user 230 clicks on the right button provided in the wheel input 210 of the wheel input device 125 in a circumstance of the user interface screen 1410 (screen (b)) of the focus selecting the content 5 1415, the electronic device 110 may maintain the state of selecting the content 5 1415 without moving the focus. In this case, the electronic device 110 may maintain the user interface screen 1410 (screen (d)).

Although not shown in the drawings, if the user 230 clicks on the left button provided in the wheel input 210 of the wheel input device 125 in a circumstance of the user interface screen 1410 (screen (c)) of the focus selecting the content 6 1416, the electronic device 110 may maintain the state of selecting the content 6 1416 without moving the focus. In this case, the electronic device 110 may maintain the user interface screen 1410 (screen (c)).

Figure 15:
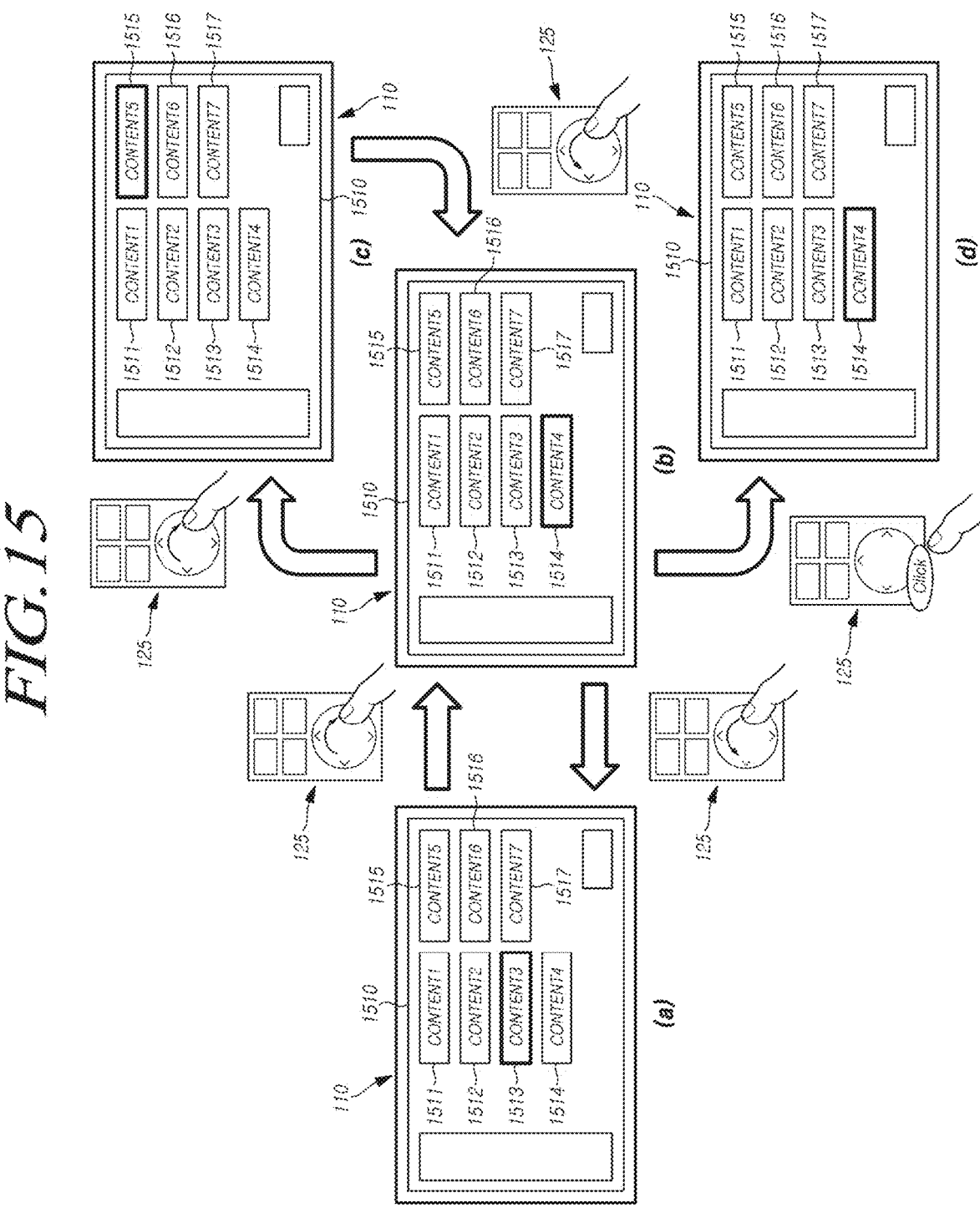
FIG. 15 is a diagram illustrating an example of driving by a wheel base signal or a key base signal in an electronic device according to various embodiments.

FIG. 15 is a diagram illustrating an example of driving by a wheel base signal or a key base signal in an electronic device (e.g., the electronic device 110 of FIG. 1) according to various embodiments.

FIG. 15 illustrates an example of a change in the user interface screen 1510 when an event occurs in which the user (e.g., the user 230 of FIG. 2) rotates the wheel input 210 provided in the wheel input device 125 in the counterclockwise or clockwise direction in the electronic device 110 in which an application (e.g., the application 730 of FIG. 7) incapable of processing a wheel base signal is executed. Here, the user interface screen 1510 considers that the focus of selecting one selection item among the plurality of selection items moves in the vertical direction (upward/downward direction), and a movement at a position (a circumstance where the selection item disposed at the upper end is selected) where the focus is not movable upward any more and a movement at a position (a circumstance where the selection item disposed at the lower end is selected) where the focus is not movable downward any more.

Referring to FIG. 15, an example of the user interface screen 1510 displayed on the display (e.g., the display 630 of FIG. 6) by executing the application 730 may be one of (a), (b), (c), or (d). The user interface screen 1510 may include a plurality of selection items 1511, 1512, 1513, 1514, 1515, 1516, and 1517 that may be selected by the user 230.

If an event in which the user 230 manipulates the wheel input device 125 occurs, the wheel input device 125 may provide a wheel base signal corresponding to the occurring event to the electronic device 110. The event caused by the user 230 manipulating the wheel input device 125 may be discerned by, e.g., the rotation (e.g., 234 of FIG. 2) direction of the wheel input (e.g., the wheel input 210 of FIG. 2).

According to an embodiment, as illustrated, when the user 230 rotates the wheel input 210 provided in the wheel input device 125 in the counterclockwise direction, the wheel input device 125 may provide the first wheel base signal to the electronic device 110. The first wheel base signal may include direction identification information indicating that the rotation direction is the counterclockwise direction and rotation amount information (e.g., information about the rotation angle) indicating the rotation degree.

The electronic device 110 may receive the first wheel base signal, may identify that the wheel input 210 has rotated in the counterclockwise direction based on the direction identification information included in the received first wheel base signal, and may identify how much rotation has been performed based on the rotation amount information indicating the rotation information included in the received first wheel base signal. According to an embodiment, the electronic device 110 may generate a key base signal considering the identified rotation direction and the identified rotation amount. In an embodiment, the electronic device 110 may determine the direction of the key base signal as the upward direction considering that the identified rotation direction is the counterclockwise direction. In an embodiment, the electronic device 110 may determine the moving distance by which the focus is to be moved upward by the key base signal considering the identified rotation amount. The moving distance may correspond to, e.g., the number of times the up key provided in the remote control (e.g., the remote control 121 of FIG. 1) is pressed. In the following description, for convenience, it will be assumed that the identified rotation amount is the degree to which the up key provided in the remote control 121 is pressed once. However, when the identified rotation amount is larger than or equal to it, the electronic device 110 may obtain the number of times the up key is pressed in the remote control 121 in proportion to the identified rotation amount, and may move the focus upward by the obtained number of times of pressing.

In an embodiment, if it is identified that the rotation direction is the counterclockwise direction in a circumstance of the user interface screen 1510 (screen (b)) of the focus selecting the content 4 1514, the electronic device 110 may display the user interface screen 1510 (screen (a)) in which the focus is moved in the upper direction so that the content 3 1513 disposed on the upper side of the content 4 1514 is selected.

In an embodiment, if it is identified that the rotation direction is the counterclockwise direction in a circumstance of the user interface screen 1510 (screen (c)) of the focus selecting the content 5 1515, the electronic device 110 may perform control to move the focus to the content disposed on the upper side of the content 5 1515. However, the electronic device 110 may recognize that the focus is currently at a position where no content is present upward and accordingly display the user interface screen 1510 (screen (b)) where the focus has been moved to select the content 4 1514 disposed at the lower end of the left row.

According to an embodiment, as illustrated, when the user 230 rotates the wheel input 210 provided in the wheel input device 125 in the clockwise direction, the wheel input device 125 may provide the second wheel base signal to the electronic device 110. The second wheel base signal may include direction identification information indicating that the rotation direction is the clockwise direction and rotation amount information (e.g., information about the rotation angle) indicating the rotation degree.

The electronic device 110 may receive the second wheel base signal, may identify that the wheel input 210 has rotated in the clockwise direction based on the direction identification information included in the received second wheel base signal, and may identify how much rotation has been performed based on the rotation amount information indicating the rotation information included in the received second wheel base signal. According to an embodiment, the electronic device 110 may generate a key base signal considering the identified rotation direction and the identified rotation amount. In an embodiment, the electronic device 110 may determine the direction of the key base signal as the downward direction considering that the identified rotation direction is the clockwise direction. In an embodiment, the electronic device 110 may determine the moving distance by which the focus is to be moved downward by the key base signal considering the identified rotation amount. The moving distance may correspond to, e.g., the number of times the down key provided in the remote control (e.g., the remote control 121 of FIG. 1) is pressed. In the following description, for convenience, it will be assumed that the identified rotation amount is the degree to which the down key provided in the remote control 121 is pressed once. However, when the identified rotation amount is larger than or equal to it, the electronic device 110 may obtain the number of times the down key is pressed in the remote control 121 in proportion to the identified rotation amount, and may move the focus downward by the obtained number of times of pressing.

In an embodiment, if it is identified that the rotation direction is the clockwise direction in a circumstance of the user interface screen 1510 (screen (a)) of the focus selecting the content 3 1513, the electronic device 110 may display the user interface screen 1510 (screen (b)) in which the focus is moved in the downward direction so that the content 4 1514 disposed on the lower side of the content 3 1513 is selected.

In an embodiment, if it is identified that the rotation direction is the clockwise direction in a circumstance of the user interface screen 1510 (screen (b)) of the focus selecting the content 4 1514, the electronic device 110 may perform control to move the focus to the content disposed on the lower side of the content 5 1515. However, the electronic device 110 may recognize that the focus is currently at a position where no content is present downward and accordingly display the user interface screen 1510 (screen (c)) where the focus has been moved to select the content 5 1515 disposed at the upper end of the right row.

In an embodiment, if the user 230 clicks on the lower button provided in the wheel input 210 of the wheel input device 125 in a circumstance of the user interface screen 1510 (screen (b)) of the focus selecting the content 4 1514, the electronic device 110 may maintain the state of selecting the content 4 1514 without moving the focus. In this case, the electronic device 110 may maintain the user interface screen 1510 (screen (d)).

Although not shown in the drawings, if the user 230 clicks on the upper button provided in the wheel input 210 of the wheel input device 125 in a circumstance of the user interface screen 1510 (screen (c)) of the focus selecting the content 5 1515, the electronic device 110 may maintain the state of selecting the content 5 1515 without moving the focus. In this case, the electronic device 110 may maintain the user interface screen 1510 (screen (c)).

A method for controlling a user interface in an electronic device according to an example embodiment may comprise:

obtaining a wheel base signal for a running application by wheel manipulation, obtaining an input signal type supported in the running application, based on the input signal type supported in the running application being a first input signal type, transferring the obtained wheel base signal to the running application, and based on the input signal type supported in the running application being a second input signal type, changing the obtained wheel base signal into a direction control signal and transferring the direction control signal to the running application.

In the method for controlling the user interface in the electronic device according to an example embodiment, the first input signal type may include an input signal type indicating that the running application may process the wheel base signal, and the second input signal type may include an input signal type indicating that the running application may not process the wheel base signal.

In the method for controlling the user interface according to an example embodiment, the wheel base signal may include at least one of a first wheel base signal according to counterclockwise rotation of the wheel by a manipulation or a second wheel base signal according to clockwise rotation of the wheel by the manipulation. The direction control signal may include at least one of a first direction control signal controlling a focus movement in an upper direction, a second direction control signal controlling the focus movement in a lower direction, a third direction control signal controlling the focus movement in a left direction, or a fourth direction control signal controlling the focus movement in a right direction.

The method for controlling the user interface according to an example embodiment may further comprise: based on a plurality of target objects being arranged in a vertical direction, outputting the obtained first wheel base signal as the first direction control signal, or outputting the obtained second wheel base signal as the second direction control signal.

The method for controlling the user interface according to an example embodiment may further comprise: based on a plurality of target objects being arranged in a horizontal direction, outputting the obtained first wheel base signal as the third direction control signal, or outputting the obtained second wheel base signal as the fourth direction control signal.

The method for controlling the user interface according to an example embodiment may further comprise: based on the plurality of target objects being arranged in the vertical direction, and the focus indicating a target object positioned at an upper end, outputting the first direction control signal as a fifth direction control signal to move the focus to indicate a target object positioned at a lower end of a left column.

The method for controlling the user interface according to an example embodiment may further comprise: based on the plurality of target objects being arranged in the vertical direction, and the focus indicating a target object positioned at a lower end, outputting the second direction control signal as a sixth direction control signal to move the focus to indicate the target object positioned at the lower end of the left column.

The method for controlling the user interface according to an example embodiment may further comprise: based on the plurality of target objects being arranged in the horizontal direction, and the focus indicating a target object positioned at a left end, outputting the third direction control signal as a seventh direction control signal to move the focus to indicate a target object positioned at a right end of an upper column.

The method for controlling the user interface according to an example embodiment may further comprise: based on the plurality of target objects being arranged in the horizontal direction, and the focus indicating a target object positioned at a right end, outputting the fourth direction control signal as an eighth direction control signal to move the focus to indicate the target object positioned at a left end of a lower column.

An electronic device according to an example embodiment may comprise: a transceiver configured to transmit and/or receive a wheel base signal generated by wheel manipulation based on a specified communication scheme and at least one processor, comprising processing circuitry, individually and/or collectively, configured to: generate a command to perform a specific operation by the wheel base signal; obtain the wheel base signal; obtain an input signal type supported in a running application, based on the input signal type supported in the running application being a first input signal type, transfer the obtained wheel base signal to the running application, and based on the input signal type supported in the running application being a second input signal type, change the obtained wheel base signal into a direction control signal and transfer the direction control signal to the running application.

In the electronic device according to an example embodiment, the first input signal type may include an input signal type indicating that the running application may process the wheel base signal, and the second input signal type may include an input signal type indicating that the running application may not process the wheel base signal.

In the electronic device according to an example embodiment, the wheel base signal may include at least one of a first wheel base signal according to counterclockwise rotation of the wheel by a manipulation or a second wheel base signal according to clockwise rotation of the wheel by the manipulation. The direction control signal may include at least one of a first direction control signal controlling a focus movement in an upper direction, a second direction control signal controlling the focus movement in a lower direction, a third direction control signal controlling the focus movement in a left direction, or a fourth direction control signal controlling the focus movement in a right direction.

In the electronic device according to an example embodiment, at least one processor, individually and/or collectively, may be configured to, based on a plurality of target objects being arranged in a vertical direction, output the obtained first wheel base signal as the first direction control signal, or output the obtained second wheel base signal as the second direction control signal.

In the electronic device according to an example embodiment, at least one processor, individually and/or collectively, may be configured to, based on a plurality of target objects being arranged in a horizontal direction, output the obtained first wheel base signal as the third direction control signal, or output the obtained second wheel base signal as the fourth direction control signal.

In the electronic device according to an example embodiment, at least one processor, individually and/or collectively, may be configured to, based on the plurality of target objects being arranged in the vertical direction, and the focus indicating a target object positioned at an upper end, output the first direction control signal as a fifth direction control signal to move the focus to indicate a target object positioned at a lower end of a left column.

In the electronic device according to an example embodiment, at least one processor, individually and/or collectively, may be configured to, based on the plurality of target objects being arranged in the vertical direction, and the focus indicating a target object positioned at a lower end, output the second direction control signal as a sixth direction control signal to move the focus to indicate the target object positioned at the lower end of the left column.

In the electronic device according to an example embodiment, at least one processor, individually and/or collectively, may be configured to, based on the plurality of target objects being arranged in the horizontal direction, and the focus indicating a target object positioned at a left end, output the third direction control signal as a seventh direction control signal to move the focus to indicate a target object positioned at a right end of an upper column.

In the electronic device according to an example embodiment, at least one processor, individually and/or collectively, may be configured to, based on the plurality of target objects being arranged in the horizontal direction, and the focus indicating a target object positioned at a right end, output the fourth direction control signal as an eighth direction control signal to move the focus to indicate the target object positioned at a left end of a lower column.

In the electronic device according to an example embodiment, at least one processor, individually and/or collectively, may be configured to store information about an input device and output the direction control signal.

The electronic device 110 or 600 according to various embodiments of the disclosure may be one of various types of electronic devices. The electronic devices 110 or 600 may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine. For example, a processor of the machine (e.g., the control device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for controlling a user interface in an electronic device, the method comprising:

obtaining a wheel base signal for a running application by manipulation of a wheel;

obtaining an input signal type supported in the running application;

based on the input signal type supported in the running application being a first input signal type, transferring the obtained wheel base signal to the running application; and based on the input signal type supported in the running application being a second input signal type, changing the obtained wheel base signal into a direction control signal and transferring the direction control signal to the running application, wherein the first input signal type includes an input signal type indicating that the running application may process the wheel base signal, and the second input signal type includes an input signal type indicating that the running application may not process the wheel base signal.

2. The method of claim 1, comprising: receiving a key base signal corresponding to an electrical signal generated in response to manipulation of a key input device, and transferring the received key base signal to the running application for performing control based on the key base signal.

3. The method of claim 1, wherein the wheel base signal includes at least one of a first wheel base signal according to counterclockwise rotation of the wheel by a manipulation or a second wheel base signal according to clockwise rotation of the wheel by the manipulation, and wherein the direction control signal includes at least one of a first direction control signal controlling a focus movement in an upper direction, a second direction control signal controlling the focus movement in a lower direction, a third direction control signal controlling the focus movement in a left direction, or a fourth direction control signal controlling the focus movement in a right direction.

4. The method of claim 3, further comprising:

based on a plurality of target objects being arranged in a vertical direction, outputting the obtained first wheel base signal as the first direction control signal; or outputting the obtained second wheel base signal as the second direction control signal.

5. The method of claim 4, further comprising:

based on the plurality of target objects being arranged in the vertical direction, and a focus indicating a target object positioned at an upper end, outputting the first direction control signal as a fifth direction control signal to move the focus to indicate a target object positioned at a lower end of a left column.

6. The method of claim 4, further comprising:

based on the plurality of target objects being arranged in the vertical direction, and a focus indicating a target object positioned at a lower end, outputting the second direction control signal as a sixth direction control signal to move the focus to indicate the target object positioned at an upper end of a right column.

7. The method of claim 3, further comprising:

based on a plurality of target objects being arranged in a horizontal direction, outputting the obtained first wheel base signal as the third direction control signal; or outputting the obtained second wheel base signal as the fourth direction control signal.

8. The method of claim 7, further comprising:

based on the plurality of target objects being arranged in the horizontal direction, and a focus indicating a target object positioned at a left end, outputting the third direction control signal as a seventh direction control signal to move the focus to indicate a target object positioned at a right end of an upper row.

9. The method of claim 7, further comprising:

based on the plurality of target objects being arranged in the horizontal direction, and a focus indicating a target object positioned at a right end, outputting the fourth direction control signal as an eighth direction control signal to move the focus to indicate the target object positioned at a left end of a lower row.

10. The method of claim 7, further comprising: storing information about a type of an input device; and transferring the direction control signal to the running application based on information about the type of the input device.

11. An electronic device comprising:

a transceiver configured to transmit and/or receive a wheel base signal generated by manipulation of a wheel based on a specified communication scheme; and at least one processor, comprising processing circuitry, individually and/or collectively configured to:

generate a command to perform a specific operation by the wheel base signal;

obtain the wheel base signal;

obtain an input signal type supported in a running application;

based on the input signal type supported in the running application being a first input signal type, transfer the obtained wheel base signal to the running application; and based on the input signal type supported in the running application being a second input signal type, change the obtained wheel base signal into a direction control signal and transfer the direction control signal to the running application, wherein the first input signal type includes an input signal type indicating that the running application may process the wheel base signal, and the second input signal type includes an input signal type indicating that the running application may not process the wheel base signal.

12. The electronic device of claim 11, wherein the at least one processor, individually and/or collectively, is configured to:

receive a key base signal corresponding to an electrical signal generated in response to manipulation of a key input device, and transfer the received key base signal to the running application for performing control based on the key base signal.

13. The electronic device of claim 11, wherein the wheel base signal includes at least one of a first wheel base signal according to counterclockwise rotation of the wheel by a manipulation or a second wheel base signal according to clockwise rotation of the wheel by the manipulation, and wherein the direction control signal includes at least one of a first direction control signal controlling a focus movement in an upper direction, a second direction control signal controlling the focus movement in a lower direction, a third direction control signal controlling the focus movement in a left direction, or a fourth direction control signal controlling the focus movement in a right direction.

14. The electronic device of claim 13, wherein the at least one processor, individually and/or collectively, is configured to:

based on a plurality of target objects being arranged in a vertical direction, output the obtained first wheel base signal as the first direction control signal; or output the obtained second wheel base signal as the second direction control signal.

15. The electronic device of claim 14, wherein the at least one processor, individually and/or collectively, is configured to:

based on the plurality of target objects being arranged in the vertical direction, and a focus indicating a target object positioned at an upper end, output the first direction control signal as a fifth direction control signal to move the focus to indicate a target object positioned at a lower end of a left column.

16. The electronic device of claim 14, wherein the at least one processor, individually and/or collectively, is configured to:

based on the plurality of target objects being arranged in the vertical direction, and a focus indicating a target object positioned at a lower end, output the second direction control signal as a sixth direction control signal to move the focus to indicate the target object positioned at an upper end of a right column.

17. The electronic device of claim 13, wherein the at least one processor, individually and/or collectively, is configured to:

based on a plurality of target objects being arranged in a horizontal direction, output the obtained first wheel base signal as the third direction control signal; or output the obtained second wheel base signal as the fourth direction control signal.

18. The electronic device of claim 17, wherein the at least one processor, individually and/or collectively, is configured to:

based on the plurality of target objects being arranged in the horizontal direction, and a focus indicating a target object positioned at a left end, output the third direction control signal as a seventh direction control signal to move the focus to indicate a target object positioned at a right end of an upper row.

19. The electronic device of claim 17, wherein the at least one processor, individually and/or collectively, is configured to:

based on the plurality of target objects being arranged in the horizontal direction, and a focus indicating a target object positioned at a right end, output the fourth direction control signal as an eighth direction control signal to move the focus to indicate the target object positioned at a left end of a lower row.

20. The electronic device of claim 11, wherein the at least one processor, individually and/or collectively, is configured to store information about a type of an input device and transfer the direction control signal to the running application.

* * * * *